(12) United States Patent
Kwon et al.

(10) Patent No.: US 10,672,033 B2
(45) Date of Patent: Jun. 2, 2020

(54) METHOD AND APPARTUS FOR ADVERTISING ON BASIS OF AREA USING DEVICE-TO-DEVICE DISCOVERY

(71) Applicant: Samsung Electronics Co., Ltd., Gyeonggi-do (KR)

(72) Inventors: Sangwook Kwon, Yongin-si (KR); Youngbin Chang, Anyang-si (KR); Kyungkyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 15/545,669

(22) PCT Filed: Jan. 20, 2016

(86) PCT No.: PCT/KR2016/000582
§ 371 (c)(1),
(2) Date: Jul. 21, 2017

(87) PCT Pub. No.: WO2016/117923
PCT Pub. Date: Jul. 28, 2016

(65) Prior Publication Data
US 2017/0372368 A1    Dec. 28, 2017

(30) Foreign Application Priority Data

Jan. 21, 2015    (KR) ........................ 10-2015-0010049

(51) Int. Cl.
*G06Q 30/02*    (2012.01)
*H04W 8/00*    (2009.01)
(Continued)

(52) U.S. Cl.
CPC ..... *G06Q 30/0267* (2013.01); *G06Q 30/0261* (2013.01); *H04W 8/005* (2013.01);
(Continued)

(58) Field of Classification Search
CPC .......... G06Q 30/0267; G06Q 30/0261; H04W 8/005; H04W 4/023; H04W 4/06; H04W 84/042; H04W 92/18; H04L 67/16
See application file for complete search history.

(56) References Cited

U.S. PATENT DOCUMENTS 7,865,394 B1 *   1/2011   Calloway ............. G06Q 10/107
                                                        370/252
2007/0259634 A1 *   11/2007   MacLeod ......... G08G 1/096716
                                                        455/186.1
(Continued)

FOREIGN PATENT DOCUMENTS

CN    101277491 A  *  10/2008
CN    104380692 A  *   2/2015  ......... G06Q 30/0241
(Continued)

OTHER PUBLICATIONS

International Search Report dated Apr. 27, 2016 in connection with International Patent Application No. PCT/KR2016/000582.
Written Opinion of the International Searching Authority dated Apr. 27, 2016 in connection with International Patent Application No. PCT/KR2016/000582.

*Primary Examiner* — Raquel Alvarez

(57) ABSTRACT

The present disclosure relates to a 5G or pre-5G communication system for supporting a higher data transmission rate than a 4G communication system such as LTE. A security problem in which information of a monitoring device is provided to another PLMN exists in the procedure for connecting ProSe Functions of two PLMNs and transmitting and receiving information therebetween, and thus, configuration of a D2D discovery service between different providers (inter PLMN) is difficult in reality, despite being defined in the standard. Therefore, the present invention provides a method of using a content server with an existing D2D discovery method in order to advertise, through D2D discovery, real-time local area advertisements to device of a plurality of providers. A monitoring device requests adver- (Continued)

tisement information directly from a content server, or requests advertisement information from a different PLMN ProSe Function, and thereby the other PLMN ProSe Function may request advertisement information from a content server.

20 Claims, 17 Drawing Sheets

(51) Int. Cl.
  *H04L 29/08* (2006.01)
  *H04W 4/02* (2018.01)
  *H04W 4/06* (2009.01)
  *H04W 84/04* (2009.01)
  *H04W 92/18* (2009.01)

(52) U.S. Cl.
  CPC ............ *H04L 67/16* (2013.01); *H04W 4/023* (2013.01); *H04W 4/06* (2013.01); *H04W 84/042* (2013.01); *H04W 92/18* (2013.01)

(56) References Cited

U.S. PATENT DOCUMENTS

| | | | |
|---|---|---|---|
| 2009/0182619 A1* | 7/2009 | Menditto | G06Q 30/02 705/14.64 |
| 2010/0042493 A1* | 2/2010 | Nino | G06Q 30/02 705/14.45 |
| 2013/0157670 A1 | 6/2013 | Koskela et al. | |
| 2013/0188515 A1 | 7/2013 | Pinheiro et al. | |
| 2014/0304081 A1 | 10/2014 | Jung et al. | |
| 2016/0014825 A1 | 1/2016 | Kim et al. | |

FOREIGN PATENT DOCUMENTS

| | | |
|---|---|---|
| KR | 1020140001583 A | 1/2014 |
| KR | 1020140073112 A | 6/2014 |
| KR | 1020140122348 A | 10/2014 |
| WO | 2014/142482 A1 | 9/2014 |

* cited by examiner

METHOD AND APPARTUS FOR ADVERTISING ON BASIS OF AREA USING DEVICE-TO-DEVICE DISCOVERY

CROSS-REFERENCE TO RELATED APPLICATION(S)

The present application claims priority under 35 U.S.C. § 365 to International Patent Application No. PCT/KR2016/000582 filed Jan. 20, 2016, which claims priority to Korean Patent Application No. 10-2015-0010049, filed Jan. 21, 2015, each of which are incorporated herein by reference into the present disclosure as if fully set forth herein.

TECHNICAL FIELD

The present invention relates to Device-to-Device (D2D) discovery and, in particular, to a method and apparatus for advertising a local area advertisement in real time using D2D discovery for terminals of different operators.

BACKGROUND

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (cloud RAN), ultra-dense network, Device to Device (D2D) communication, wireless backhaul, moving network, cooperative communication, Coordinated Multi-Points (CoMP), and interference cancellation.

Furthermore, the ongoing research includes the use of Hybrid Frequency Shift Keying (FSK) and Quadrature Amplitude Modulation (QAM) (FQAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

With the popularization of smartphones, data traffic is increasing rapidly. The increasing number of smartphone users spurs the consumption of smartphone-based application services such as Social Network Service (SNS) and gaming service, resulting in even greater increases in data traffic. In particular, the expansion of communication between intelligent things (such as person-to-machine communication and machine-to-machine communication), which is emerging as a new communication paradigm beyond the legacy person-to-person communication, is likely to produce an unbearable concentration of traffic to base stations.

There is therefore a need of a technology to solve such problems, and direct communication between devices is coming into the spotlight as one of such technologies. This technology, so called Device to Device (D2D) communication, is promising because it is compatible with both the licensed band communication system such as the cellular communication system and the unlicensed band communication system such as the Wireless Local Area Network (WLAN) system.

In a communication environment where networks of multiple operators coexist, there is a need of an inter-operator D2D discovery service. In order to advertise a local area advertisement to the terminals camped on the networks of different operators, the use of a contents server can be considered to assist the legacy D2D discovery scheme.

SUMMARY

In accordance with an aspect of the present invention, an advertisement broadcast method of a terminal performing Device-to-Device (D2D) communication includes generating advertisement information, acquiring an advertisement code based on the advertisement information, transmitting the advertisement information to a contents server, receiving advertisement-related information from the contents server, and broadcasting a discovery message including the advertisement code and the advertisement-related information.

In accordance with another aspect of the present invention, an advertisement reception method of a terminal performing Device-to-Device (D2D) communication includes receiving a discovery message including an advertisement code and advertisement-related information, the discovery message being broadcast by an announcing terminal; determining whether a Public Land Mobile Network (PLMN) of the terminal is identical with a PLMN of the announcing terminal based on the advertisement code included in the discovery message; transmitting, if the PLMNs are different from each other, an advertisement information request to a contents server; and receiving advertisement information from the contents server, wherein the advertisement information request comprises the advertisement code or the advertisement-related information.

In accordance with another aspect of the present invention, an advertisement broadcast assistance method of a content server supporting Device-to-Device (D2D) discovery includes receiving advertisement information transmitted by an announcing terminal; transmitting advertisement-related information to the announcing terminal; receiving, if a Public Land Mobile Network (PLMN) of the announcing terminal is not identical with a PLMN of a monitoring terminal, an advertisement information request transmitted by the monitoring terminal; and transmitting the advertisement information to the monitoring terminal, wherein the announcing terminal broadcasts a discovery message including an advertisement code generated based on the advertisement information and the advertisement-related information, and the monitoring terminal receives the discovery message and determines whether the PLMNs of the announcing and monitoring terminals are identical with each other based on the advertisement code.

In accordance with another aspect of the present invention, a terminal for broadcasting a Device-to-Device (D2D) advertisement includes a transceiver which transmits and receives signals and a controller which is configured to generate advertisement information; acquires an advertisement code based on the advertisement information; and transmit the advertisement information to a contents server, receive advertisement-related information from the contents server, and broadcast a discovery message including the advertisement code and the advertisement-related information.

In accordance with another aspect of the present invention, a terminal for receiving a Device-to-Device (D2D) advertisement includes a transceiver which transmits and receives signals and a controller which is configured to receive a discovery message including an advertisement code and advertisement-related information, the discovery message being broadcast by an announcing terminal; determines whether a Public Land Mobile Network (PLMN) of the terminal is identical with a PLMN of the announcing terminal based on the advertisement code included in the discovery message; and transmit, if the PLMNs are different from each other, an advertisement information request to a contents server and receive advertisement information from the contents server in response to the advertisement information request, wherein the advertisement information request comprises the advertisement code or the advertisement-related information.

In accordance with still another aspect of the present invention, a contents server for assisting Device-to-Device (D2D) discovery advertisement broadcast includes a transceiver which transmits and receives signals and a controller is configured to receive advertisement information transmitted by an announcing terminal; transmit advertisement-related information to the announcing terminal; receive, if a Public Land Mobile Network (PLMN) of the announcing terminal is identical with a PLMN of a monitoring terminal, an advertisement information request transmitted by the monitoring terminal; and transmit the advertisement information to the monitoring terminal, wherein the announcing terminal broadcasts a discovery message including an advertisement code generated based on the advertisement information and the advertisement-related information, and the monitoring terminal receives the discovery message and determines whether the PLMNs of the announcing and monitoring terminals are identical with each other base on the advertisement code.

The contents server-assisted D2D discovery method and apparatus of the present invention is advantageous in terms of facilitating inter-operator (inter-Public Land Mobile Network (PLMN)) D2D discovery service to advertise a real time local area advertisement to the terminals camped on different PLMNs.

DETAILED DESCRIPTION

Figure 1:
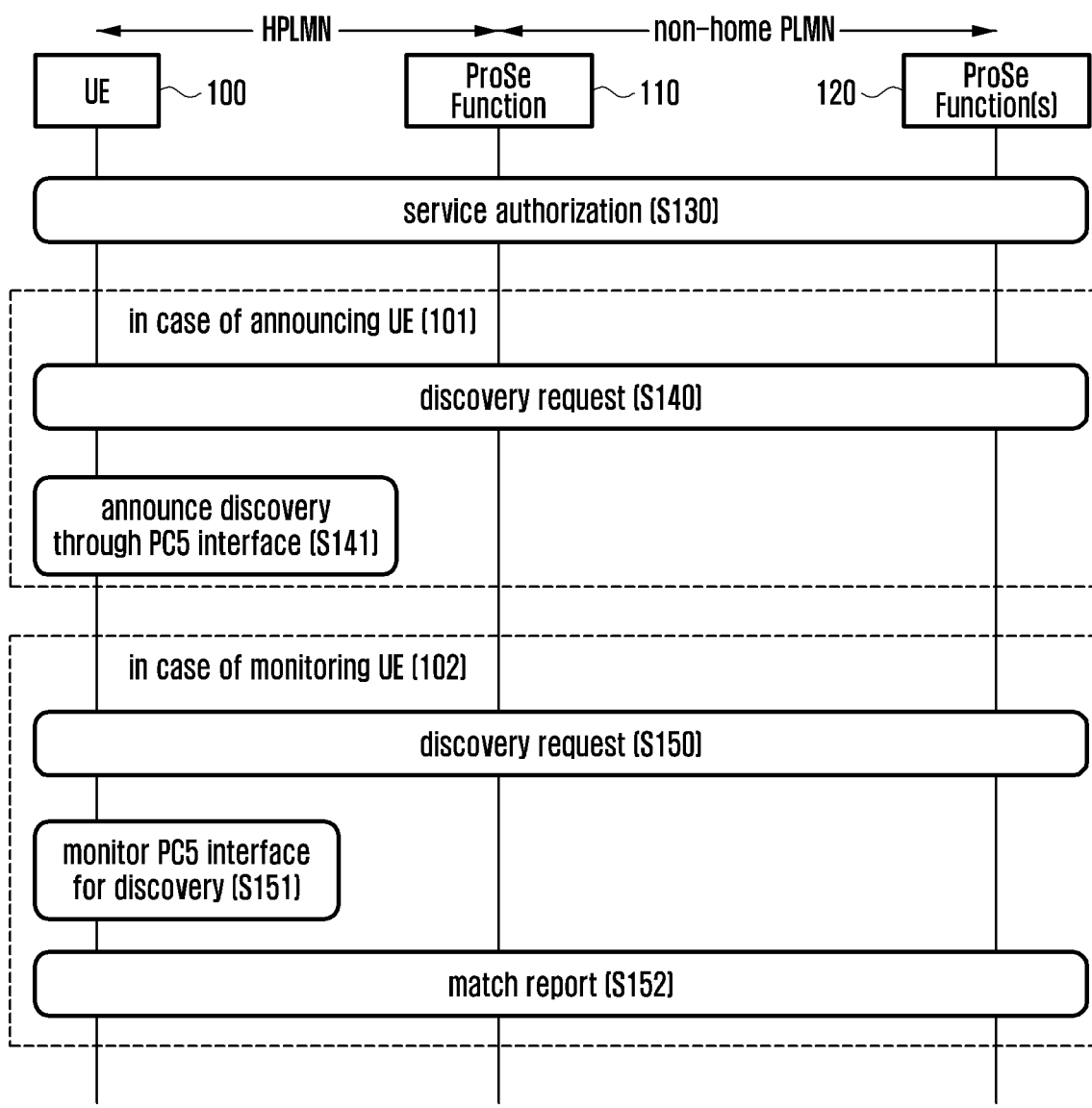
FIG. 1 is a diagram illustrating a D2D discovery procedure specified in 3GPP Release 12.

Although the description is directed to the OFDM-based radio communication system, particularly the 3GPP E-UTRAN and D2D communication system, it will be understood by those skilled in the art that the present invention can be applied even to other communication systems having a similar technical background and channel format, with a slight modification, without departing from the spirit and scope of the present invention.

The present invention may be implemented with D2D terminals. In an embodiment of the present invention, a terminal may operate as a transmit terminal, which is in charge of resource allocation and broadcast. Whether a terminal is to operate as a transmit terminal or a receive terminal may be determined by a base station or according to a predetermined rule. In the following description, the terms "transmit and receive terminals" may be interchangeably referred to as "some terminals and remaining terminals," "terminal and another terminal," or "first group terminal and second group terminal."

In the present invention, the D2D communication is performed by the basic time unit of "frame." The frame may be referred to as iterative duration, iterative period, D2D frame, or the like. The term "frame" can be used in the same concept as the frame defined in LTE without limitation in structure and format. A frame may span 20 ms or 40 ms in the time domain, but it is not limited thereto. A frame may consist of a plurality of Resource Blocks (RBs) in the frequency domain. With reference to the LTE standard, a terminal uses the resources by the Transmission Time Interval (TTI), and one TTI has a length of 1 ms, which is equal to the length a subframe. In an embodiment, assuming that 5 RBs constitute one D2D RB, the UE may use one of 10 D2D RBs in one subframe.

The frame may be configured to have a control region (hereinafter, interchangeably referred to as control period) and a data region (hereinafter, interchangeably referred to as a data period and shared region) for distributed access or to have only the data region for control-based access.

The control and data regions may be notified by a base station or preconfigured in an out-of-network area for terminals. In an embodiment, the control and data regions may be separated or shared resources in time and/or frequency.

The above-described frame structure is defined just for convenience of explanation; thus, the terms and structures related to the frame may be changed diversely without departing from the technical spirit of the present invention.

In an embodiment of the present invention, the basic resource unit selected by a terminal for data transmission/reception may be referred to as "resource," "radio resource," "resource block," "communication resource," and "D2D resource;" the resource of the control region of the frame as "control resource;" and the resource of the data region of the frame as "data resource."

The base station may control and support the resource allocation operations of a terminal according to the present invention. Although the description is directed to the operation of a UE located in an out-of-network area in which the terminal operates without control of a base station, the present invention may be applied in an in-network area (network coverage) and partial-network area in which the terminal is partially controlled by the base station. In various embodiments, a terminal may act as a coordinator in an environment where no base station exists.

A terminal may achieve synchronization based on a synchronization signal transmitted by a base station or another terminal. The control and data regions may be determined based on a signal broadcast by a base station or another terminal. The broadcast signal may be located based on a synchronization reference signal.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In the cellular communication system, D2D communication is attractive in terms of increasing traffic accommodation capability and reducing overload. That is, D2D communication is performed in such a way that two User Equipments (UEs) located in the same cell or neighboring cells establish a D2D link and exchange data through the D2D link without involvement of any evolved Node B (eNB), thereby reducing the number of communication links from 2 to 1.

The LTE-based D2D communication is divided into two phases: D2D discovery and D2D communication. D2D discovery is a process in which a UE checks for the identities or interests of proximity UEs or advertises its identity or interest to the proximity UEs. Here, the identity and interest may be represented by a UE identifier (ID), an application identifier, or a service identifier, and may be configured diversely depending on the D2D service and operation scenario.

In the present invention, it is assumed that the hierarchical layer structure of a UE includes a D2D application layer, a D2D management layer, and a D2D transport layer. The D2D application layer accommodates a D2D service application program running on the Operating System (OS), the D2D management layer is responsible for the function of converting discovery information generated by the D2D service application program to a format suited to the D2D transport layer, and the D2D transport layer corresponds to the Physical (PHY)/Media Access Control (MAC) layers of the LTE or WLAN (Wi-Fi) communication standard.

D2D discovery may be performed in a procedure as follows. If the user executes the D2D application program, the application layer generates discovery information and transmits it to the D2D management layer. The management layer converts the discover information received from the application layer to a management layer message. The management layer message is transmitted through the transport layer of the UE, and the proximity UEs receive the message by performing the reception operation in the reverse order of the transmission process.

Meanwhile, the D2D communication is a communication method of exchanging traffic between UEs without passing through any infrastructure such as eNB or Access Point (AP). The D2D communication may be performed with the proximity UEs discovered through the D2D discovery procedure or without the D2D discovery procedure. Whether the D2D discovery procedure is needed before D2D communication depends on the D2D service and operation scenario.

The D2D service scenarios may be categorized into commercial service or non-public safety service and public safety service. The D2D services may be categorized into many categories, e.g., advertisement, Social Network Service (SNS), and gaming services. Representative examples of the services are as follows.

In the case of an advertisement service, a D2D-enabled communication network operator may make it possible for preregistered stores, cafes, movie theaters, and restaurants to advertise their identities to proximity D2D users. The proximity D2D users may be interested in the information on the promotions, events, and discount coupons of the advertisers. If the identity advertised through D2D technology matches the interest of a user, the user may visit the corresponding store to acquire much information through the legacy cellular communication or D2D communication. Also, a user may discover a taxi nearby and exchange information on the destination and fare through the legacy cellular communication or D2D communication.

In the case of an SNS service, a user may broadcast the information on the application in use and application-related interests to other proximity users. Here, the identity or interest for use in D2D discovery may be a buddy list of the application or an application identifier. The user may share contents such as photos and videos with the proximity users discovered in the D2D discovery phase through the D2D communication phase.

In the case of a game service, a user may discover proximity users and a game application through the D2D discovery phase and initiate D2D communication to exchange game data with the proximity users for playing the game.

Representative examples of the public safety services are as follows.

In the case of a public safety and disaster network service, the police and firefighters may use the D2D communication technology for the purpose of public safety. That is, in the situation where the cellular communication is not available due to cellular network breakage caused by an emergency situation (such as fire and landslide) or a natural disaster situation (such as earthquake, volcanic eruption, and tsunami), the police and firefighters may search around for colleagues or share the emergency situation information with proximity users using the D2D communication technology.

The current 3GPP LTE D2D standardization is directed to both D2D discovery and D2D communication, but it is different in the standardization range. D2D discovery is aimed at commercial use; thus, it has to be designed to operate in the network coverage of an eNB (in-coverage network) and not in a situation without any eNB (out-of-coverage network).

D2D communication is aimed at the public safety and disaster network service rather than commercial use; thus it has to be designed to support all of the in-coverage communication, the out-of-coverage communication, and the partial-coverage communication (communication in the situation where some UEs are located in the coverage of the eNB and other UEs are located out of the coverage of the eNB). Accordingly, the public safety and disaster network service should be provided through D2D communication without the need of D2D discovery.

Both D2D discovery and D2D communication are characterized by being performed in LTE uplink subframes. That is, a D2D transmitter transmits D2D discovery signals and data for D2D communication in uplink subframes, and a D2D receiver receives the D2D discovery signals and data in the uplink subframes. In comparison with the legacy LTE systems in which a UE receives data and control information from the eNB in downlink and transmits data and control information to the eNB in uplink, the operations of the D2D transmitter/receiver differ from those of the legacy LTE transmitter/receiver. A UE that does not support the D2D function has an orthogonal frequency division multiplexing-based (OFDM-based) receiver to receive the downlink data and control information from the eNB and a single carrier-frequency division multiplexing-based (SF-FDM-based) transmitter to transmit uplink data and control information to the eNB. However, the D2D UE supporting both the cellular mode and D2D mode has to have an extra SC-FDM receiver to receive the D2D data and control information in uplink in addition to the OFDM-based receiver and the SC-FDM-based transmitter.

The current LTE D2D standard specifies two types of D2D discovery according to resource allocation scheme: type 1 discovery and type 2 discovery.

Type 1 discovery is characterized in that an eNB broadcasts the information about an uplink resource pool available for D2D discovery operations to the D2D UEs located within the cell under its control using a System Information Block (SIB). Here, the information may include a D2D resource size (e.g., x consecutive subframes) and a D2D resource interval (e.g., repeating every y seconds). Upon receipt of the information, the transmitting D2D UEs select the resources for use in transmitting D2D discovery signals in a distributed manner. Meanwhile, the receiving D2D UEs receive all D2D discovery signals transmitted in the resource pool indicated in the SIB.

Type 2 discovery is characterized in that an eNB notifies the receiving D2D UEs of the discovery resource pool using an SIB. The eNB allocates discovery signal transmission resources to the transmitting D2D UEs. Here, the eNB may perform a semi-persistent scheduling or a dynamic scheduling for resource allocation.

As with D2D discovery, D2D communication may be categorized into two types according to the resource allocation scheme: mode 1 communication and mode 2 communication.

Mode 1 communication is characterized in that an eNB notifies explicitly a transmitting D2D UE of data transmission resources for D2D communication. Mode 2 communication is characterized in that an eNB notifies a transmitting D2D UE of an available resource pool such that the transmitting D2D UE selects resources in the resource pool in a distributed manner.

One of the important characteristics to note is that the LTE-based D2D communication is implemented with broadcast-type communication for the public safety scenarios rather than unicast communication such as cellular communication. Accordingly, feedback such as channel measurement report and Hybrid ARQ (HARD) ACK/NACK is not supported. The most important issue of the D2D broadcast communication is to support seamless D2D communication in a situation without any eNB and guarantee highly reliable link quality. Particularly in the scenario in which the UEs operate in a distributed manner without assistance of any eNB, it is necessary to solve the resource collision problem caused by UEs contending to occupy the same resource.

Recently, the 3GPP standardization organization has been working on D2D communication for the purpose of the public safety network in the LTE Release 12 standard.

In the LTE Release 12, the aim is basically to provide a broadcast service for supporting the Push-To-Talk (PTT) function in D2D communication for a public safety network. In the situation that an eNB provides assistance, the eNB may control the UEs to broadcast signals using the resources allocated for D2D communication. Furthermore, it should be guaranteed that the UEs achieve synchronization and perform the resource allocation procedure autonomously therebetween for D2D communication for the public safety network even in a situation without assistance of any eNB. D2D communication for a public safety network should be guaranteed even in a partial coverage situation.

In order to guarantee D2D communication for a public safety network even in a situation where no eNB exists and the UEs joined in the D2D communication transmit no feedback, there is a need of a method for managing and utilizing D2D resources efficiently.

There are several well-known resource allocation schemes being proposed for D2D communication as follows.

Legacy ad-hoc/sensor networks such as Wi-Fi and ZigBee adopt the Carrier Sense Multiple Access/Collision Avoid (CSMA-CA) as a contention-based resource access scheme without scheduling-based resource allocation. The CSMA-CA makes it possible to avoid collision without over-complicated network management and thus is widely used in an environment where a small number of terminals exists.

However, increasing user dissatisfaction with the data rate at Wi-Fi hot spots has given rise to the necessity for research on an enhanced resource access scheme to replace the CSMA-CA.

Time Division Multiple Access (TDMA) is one of the most efficient resource access schemes in case a master node manages resources. In a situation where multiple master nodes exist, however, the negotiation among the master nodes for resource allocation causes extra control signal overhead and delay. Accordingly, the TDMA is not appropriate for a network extendable across a wired area such as D2D communication.

FlashLinQ developed by Qualcomm to overcome the above problems is designed for a network established through a D2D link along with the concept of slots as in TDMA for efficiency. The FlashLinQ is characterized by using a Round Robin scheduling for allocating slot resources without any central master node taking charge of resource allocation for D2D communication. The FlashLinQ also uses modified Request To Send (RTS) and Clear To Send (CTS) for TDMA resource access. The FlashLinQ shows a Signal to Interference Ratio (SIR) gain 5 times higher than that of Wi-Fi in a specific environment with the UE operating based on OFDM in a network in which the synchronization is achieved using RTS and CTS in out-of-band.

The D2D broadcast communication for a public safety network under discussion in 3GPP is similar to Wi-Fi in that no connection setup is required and to FlashLinQ in terms of achieving synchronization between terminals in a licensed band.

The legacy 3GPP D2D discovery procedure is described briefly before an introduction of the technology proposed by the present invention. Then descriptions are made of the problems of the legacy technology and methods proposed by the present invention to solve the problems.

FIG. 1 is a diagram illustrating a D2D discovery procedure specified in 3GPP Release 12.

In reference to FIG. 1, the D2D discovery procedure is performed among three entities, i.e., an announcing UE 101, a monitoring UE 102, and a ProSe Function 110 and 120 (hereinafter, interchangeably referred to as ProSe Function server). The announcing UE is a UE that broadcasts its identity or interest to other proximity UEs. The monitoring UE is a UE that receives the identities or interests broadcast by other proximity UEs and detects the information of interest. The ProSe Function is an entity that converts the identity or interest of the announcing UE to a code and notifies the monitoring UE of the identity or interest of the announcing UE that corresponds to the code.

A description is made of the procedure of FIG. 1. First, the UE 100 that wants to use the D2D discovery service performs a D2D discovery service authorization procedure in attempting network connection. If the UE has camped on the Home Public Land Mobile Network (HPLMN), it performs the D2D discovery service authorization procedure with the ProSe Function 110 of the HPLMN at step S130. If the UE is monitoring in a non-home PLMN, the HPLMN makes an authorization determination based on the information of the other PLMN. The authorization procedure is performed as specified in the legacy 3GPP LTE standard.

The UE authorized for the D2D discovery service adopts one of two behaviors. In the announcing UE behavior as denoted by reference number 101, the UE initiates a discovery request (announcing) procedure with the ProSe Function to broadcast its identity and interest at step S140. Through this procedure, the announcing UE receives a D2D discovery code matching its identity or interest from the ProSe Function. The announcing UE transmits the D2D discovery code to monitoring UEs through an interface called PC5 at step S141. In the monitoring UE behavior as denoted by reference number 102, the UE initiates a discovery request (monitoring) procedure for receiving D2D discovery codes transmitted by other proximity UEs at step S150. The monitoring UE transmits to the ProSe Function the information on the identity or interest which it wants to hear and receives whole or part of a D2D discovery code. The monitoring UE receives the D2D discovery code broadcast by the proximity announcing UEs through the PC5 interface at step S151. If the D2D discovery code of interest is received, the monitoring UE transmits the D2D discovery code (match report) to the ProSe Function to check for the identities and interests of the proximity UEs at step S152.

Figure 2:
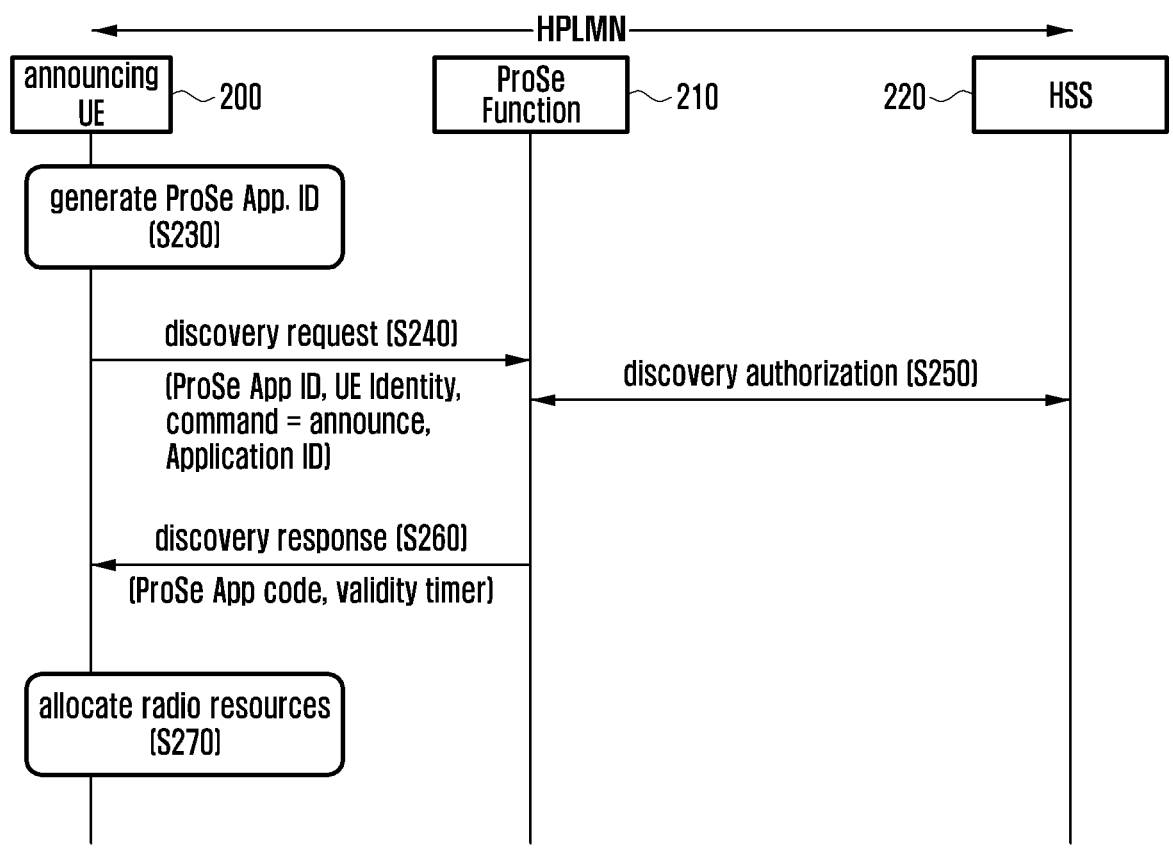
FIG. 2 is a signal flow diagram illustrating operations of an announcing UE in a D2D discovery procedure.

FIG. 2 is a signal flow diagram illustrating operations of an announcing UE in a D2D discovery procedure.

FIG. 2 shows the details of steps S140 and S141 of FIG. 1. In reference to FIG. 2, the announcing UE 200 generates (configures) a ProSe Application Identity (ID) for announcing its identity or interest to other proximity UEs at step S230. After generating the ProSe Application ID, the announcing UE transmits to the ProSe Function 210 a Discovery Request message at step S240 to request for a ProSe Application Code. The Discovery Request message includes a ProSe Application ID, UE identity, command=announce, and Application ID. Upon receipt of the Discovery Request message, the ProSe Function initiates a Discovery Authorization procedure with a Home Subscriber Server (HSS) 220 at step S250. After completing the discovery authorization, the ProSe Function generates a ProSe Application Code and code validity time information (hereinafter interchangeably referred to as validity timer). The ProSe Function transmits to the announcing UE a Discovery Response message including the validity timer at step S260. Upon receipt of the ProSe Application Code, the announcing UE is allocated D2D resources at step S270 to broadcast the ProSe Application Code.

Figure 3:
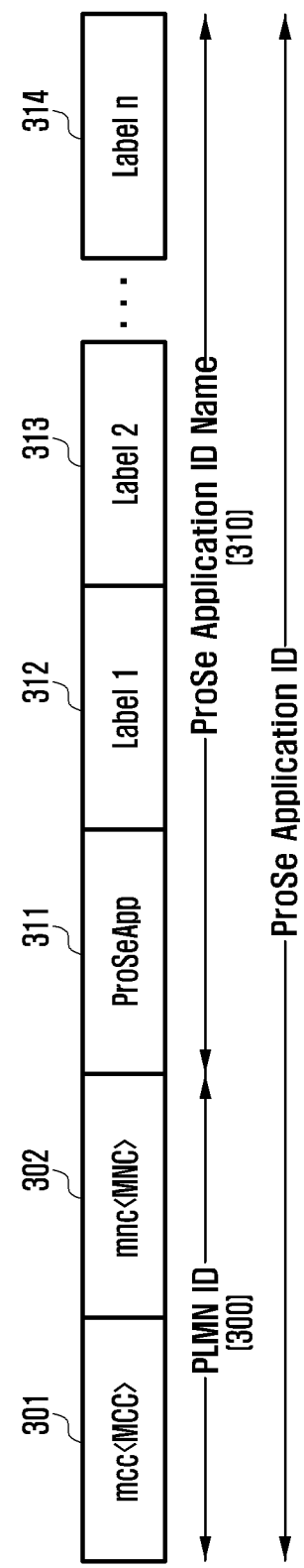
FIG. 3 is a diagram illustrating a ProSe Application ID format.

FIG. 3 is a diagram illustrating a ProSe Application ID format.

In reference to FIG. 3, the ProSe Application ID includes a PLMN ID 300 and a ProSe Application ID Name 310. The fields nested in the ProSe Application ID are separated by dots (.). The PLMN ID indicates the PLMN that has assigned the ProSe Application ID Name and consists of a mobile country code (mcc) 301 and a mobile network code (mnc) 302. The mcc indicates the country of the network operator, and the mnc is a unique ID of the network operator. For global use of the ProSe Application ID, the PLMN ID is configured with the mcc value and mnc value to which * is attached respectively like mmc*.mnc*. For country-specific use of the ProSe Application ID, the PLMN ID is configured with the mcc value and the mnc value to which * is attached. For example, if the country code is 345, the PLMN ID is generated in the format of mcc345.mnc*. The ProSe Application ID Name indicates the identity or interest of the announcing UE and is configured in a tree structure. The first field is filled with a text of ProSeAPP 311 which is followed by labels, e.g. label 1 312 and label 2 313, indicating the identity or interest of the UE. For example, in order to indicate an Italian restaurant, the ProSe Application ID Name may be configured in the format of mcc345.mnc012.ProSeApp.Food.Restaurants.Italian. The ProSe Application ID Name may be configured diversely to indicate the interest of the announcing UE.

Figure 4:
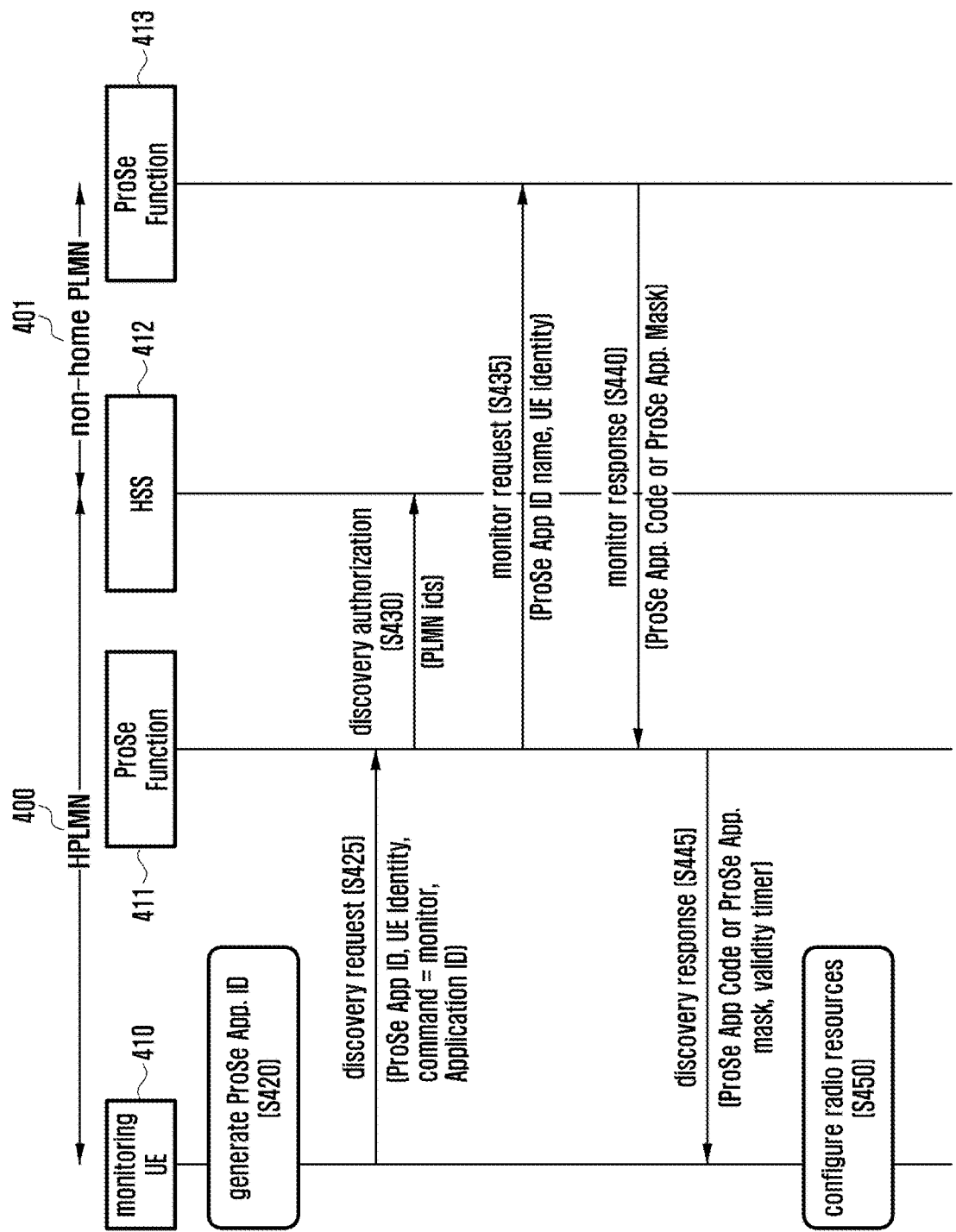
FIG. 4 is a signal flow diagram illustrating operations of a monitoring UE in a D2D discovery procedure.

FIG. 4 is a signal flow diagram illustrating operations of a monitoring UE in a D2D discovery procedure.

In reference to FIG. 4, a monitoring UE 410 configures a ProSe Application ID of interest at step S420. The ProSe Application ID is generated by the same method as that of the announcing UE. The monitoring UE 410 transmits to a ProSe Function 411 a Discovery request message including the ProSe Application ID at step S425. The discovery request message includes the ProSe Application ID, UE identity, command=monitor, and Application ID. Upon receipt of the discovery request message, the ProSe Function 411 performs an authorization procedure at step S430 with an HSS 412 to authorize whether the D2D discovery service is allowed for the UE. If the authorization succeeds, the ProSe Function 411 determines whether the PLMN ID included in the ProSe Application ID indicates its HPLMN 400. If it is determined that the ProSe Application ID is configured by a non-home PLMN 401, the ProSe Function 411 of the HPLMN 400 transmits to the ProSe Function 413 of the non-home PLMN 401 a Monitor Request message including a ProSe Application ID Name and UE identity to request for a ProSe Application Code or ProSe Application Mask at step S435 and receives a Monitor Response message including the ProSe Application Code or ProSe Application Mask from the ProSe Function 413 of the non-home PLMN 401 at step S440. The ProSe Function 411 transmits to the monitoring UE 410 a Discovery Response message including a ProSe Application Code corresponding to the ProSe Application ID, an additional ProSe Application Mask and Code, and a Mask validity timer at step S445. If the ProSe Application Code or ProSe Application Mask is received, the monitoring UE 410 configures D2D resources for receiving D2D signals at step S450.

Figure 5:
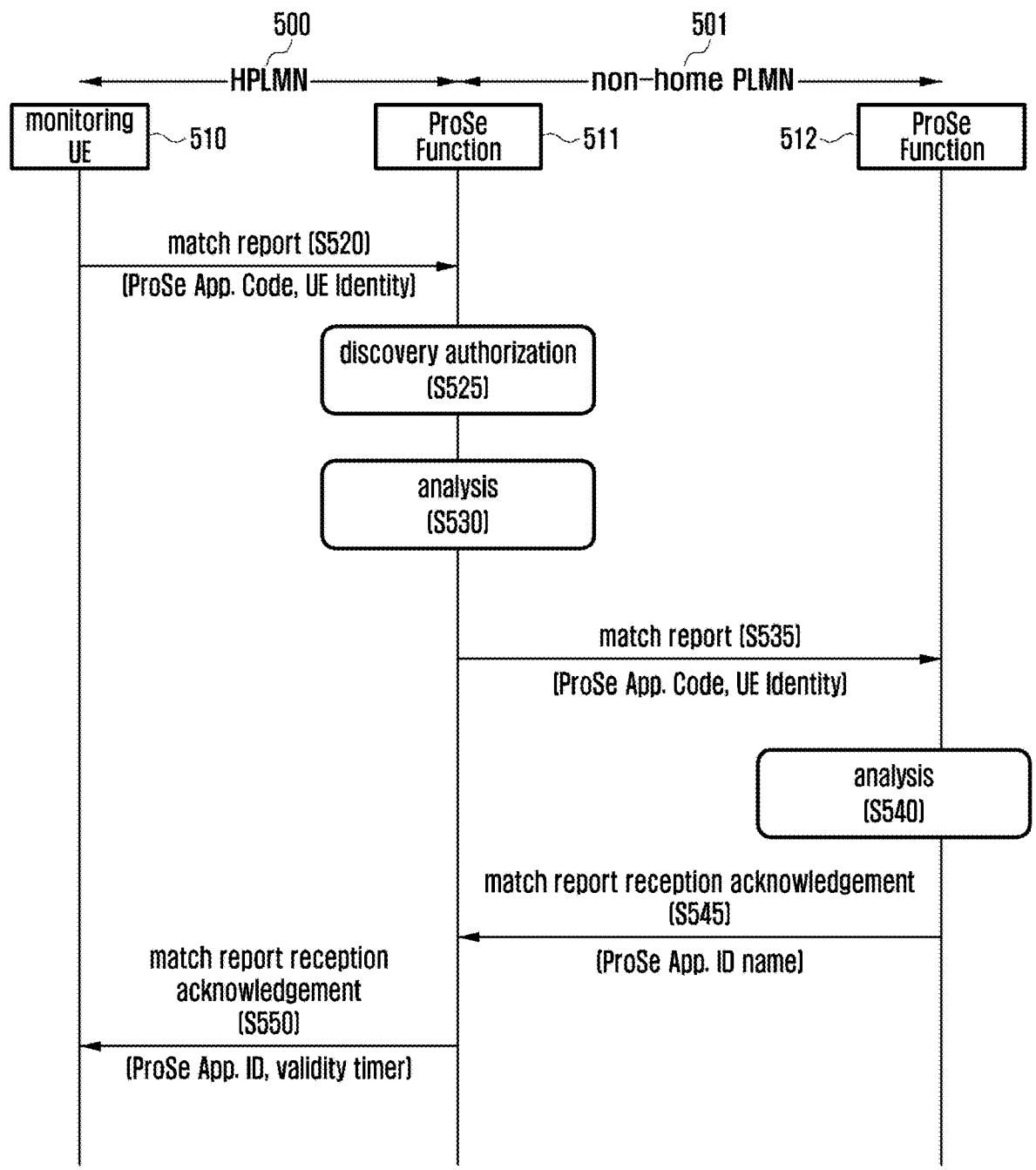
FIG. 5 is a signal flow diagram illustrating a matching operation of a monitoring UE in a D2D discovery procedure.

FIG. 5 is a signal flow diagram illustrating a matching operation of a monitoring UE in a D2D discovery procedure.

In reference to FIG. 5, a monitoring UE 510 is monitoring for a ProSe Application Code of interest with a ProSe Application Code or ProSe Application Mask. If the ProSe Application Code of interest is detected, the monitoring UE 510 transmits to a ProSe Function 511 of a HPLMN 500 a Match Report message including the ProSe Application Code and its UE ID at step S520. Upon receipt of the Match Report message, the ProSe Function 511 first performs a D2D discovery service authorization procedure with the UE ID at step S525 and analyzes the ProSe Application Code at step S530 to determine whether the ProSe Application Code is generated in the HPLMN 500 or a non-home PLMN 501. If it is determined that the ProSe Application Code is generated in the HPLMN 500, the ProSe Function 511 checks for the corresponding ProSe Application ID; if it is determined that the ProSe Application Code is generated in the non-home PLMN 501, the ProSe function 511 performs an additional procedure to acquire a ProSe Application ID from the ProSe Function 512 of the non-home PLMN 501. The ProSe Function 511 of the HPLMN 500 transmits to the ProSe function 512 of the non-home PLMN 501 a Match Report message including the corresponding ProSe Application Code and the UE ID of the monitoring UE 510 at step S535, and the ProSe Function 512 of the non-home PLMN 501 analyzes the ProSe Application code at step S540 and transmits to the ProSe Function 511 of the HPLMN 500 a Match Report Ack message including the corresponding ProSe Application ID Name at step S545. Next, the ProSe Function 511 of the HPLMN 500 transmits to the monitoring UE 510 the Match Report Ack message including the ProSe Application ID and a validity timer at step S550.

Hereinabove, the description has been made of the D2D discovery method specified in the 3GPP LTE Release 12 standard. According to the above-described method, if the ProSe Application ID or ProSe Application Code is generated by a ProSe Function of a non-home PLMN, the ProSe Function of the HPLMN has to communicate signaling with the ProSe Function of the non-home PLMN. In the case of FIG. 4, if the ProSe Application ID transmitted by the monitoring UE is generated by the ProSe Function of the non-home PLMN, the ProSe Function of the HPLMN has to inquire to the non-home PLMN ProSe Function about the ProSe Application Code. In the case of FIG. 5, if the ProSe Application Code carried in the Match Report message is generated by the ProSe Function of the non-home PLMN, the ProSe Function of the HPLMN has to inquire to the ProSe Function of the non-home PLMN about the ProSe Application ID.

Although it has been specified in the standard, the procedure of establishing a connection between two ProSe Functions of different PLMNs gives rise to security problems because the HPLMN ProSe Function has to provide the non-home PLMN ProSe Function with the UE information of the monitoring UE. In FIGS. 4 and 5, the HPLMN ProSe Function transmits the UE information of the monitoring UE to the non-home PLMN ProSe function at steps S435 and S535, respectively. This means that, although the inter-PLMN D2D discovery service has been specified in the standard, it is difficult to implement the inter-PLMN D2D discovery service in the real world.

The present invention proposes a method of using a contents server in the legacy D2D discovery procedure to allow a UE to advertise a real time local advertisement to the UEs camped on different PLMNs respectively.

Figure 6:
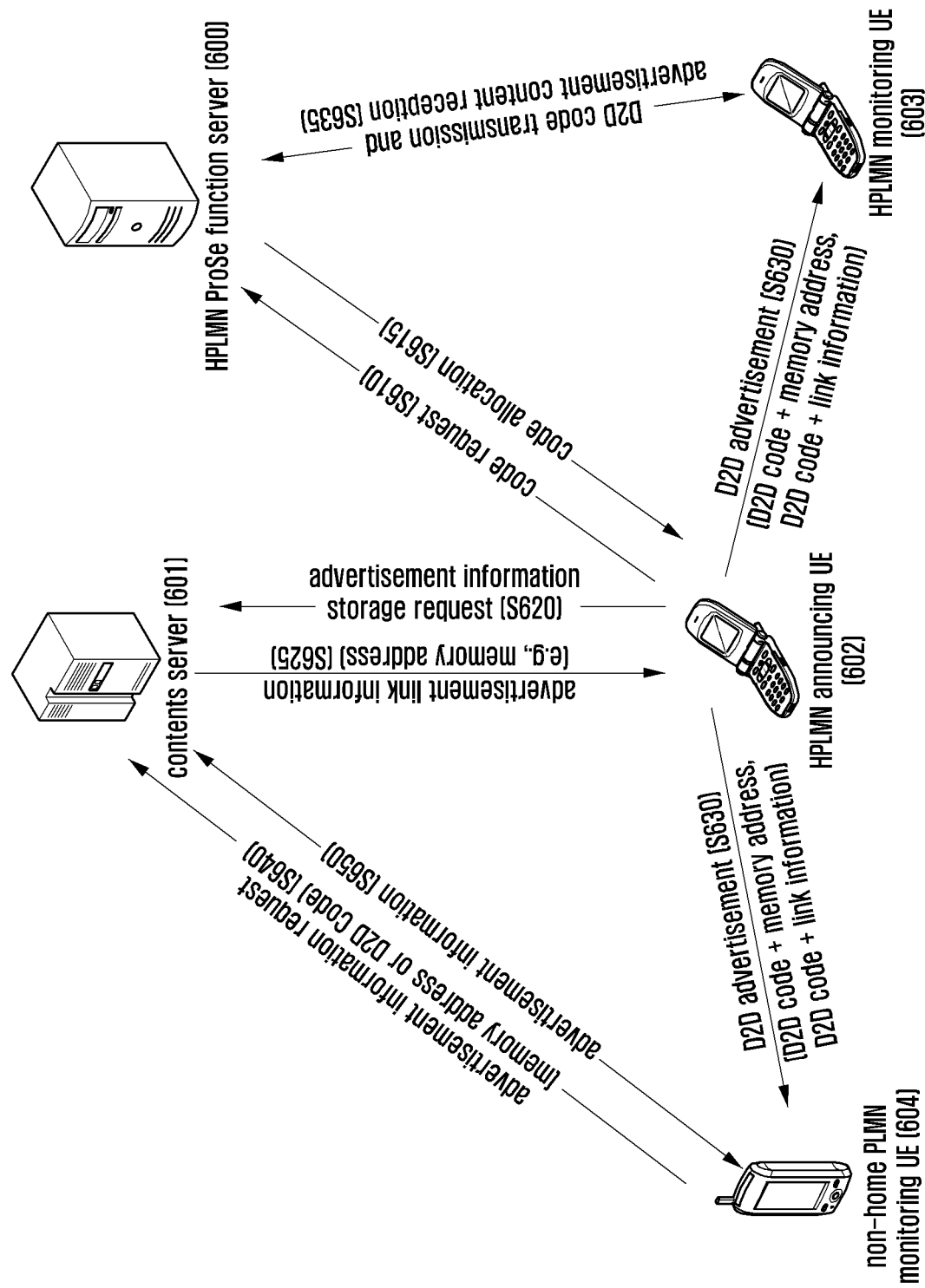
FIG. 6 is a diagram illustrating a contents server-assisted inter-PLMN D2D discovery service according to the first embodiment of the present invention.

FIG. 6 is a diagram illustrating a contents server-assisted inter-PLMN D2D discovery service according to the first embodiment of the present invention.

In reference to FIG. 6, a HPLMN announcing UE 602 initiates a procedure for acquiring a ProSe Application Code from a HPLMN ProSe Function server 600 at step S610, and the HPLMN ProSe Function server 600 generates the ProSe Application code corresponding to a ProSe Application ID to the HPLMN announcing UE at step S615. Upon receipt of the ProSe Application Code, the HPLMN announcing UE 602 requests to the contents server 601 for storing the ProSe Application ID at step S620. The contents server 601 stores the corresponding ProSe Application ID and transmits D2D advertisement link information to the HPLMN announcing UE 602 at step S625. The D2D advertisement link information may be a storage address of the ProSe Application ID; the storage address may be expressed in various forms, e.g., a memory address where the ProSe Application ID is stored. Next, the HPLMN announcing UE broadcasts the ProSe Application Code, to the proximity UEs, at step S630 in a discovery message format specified in the standard for D2D advertisement. The ProSe Application Code may be transmitted to the proximity UEs in the form of an address where the ProSe Application ID is stored in the contents server 601 using a reserved field or bits of the discovery message.

If the D2D advertisement is received from the HPLMN announcing UE 602, the HPLMN monitoring UE 603 transmits the ProSe Application Code to the HPLMN ProSe Function server 600 and receives the details of the advertisement from the HPLMN ProSe function server 600 at step S635. Meanwhile, when the D2D advertisement is received from the HPLMN announcing UE 602, the non-home PLMN monitoring UE 604 accesses the contents server 601 with a contents server address to request for the advertisement information by transmitting at step S640 the memory address where the ProSe Application ID is stored or the ProSe Application Code. In the present invention, it is assumed that all UEs know the address of the contents server. Afterward, the contents server 601 at step S650 transmits to the non-home PLMN monitoring UE 604 the ProSe Application ID (advertisement information) stored in the corresponding memory address.

Figure 7:
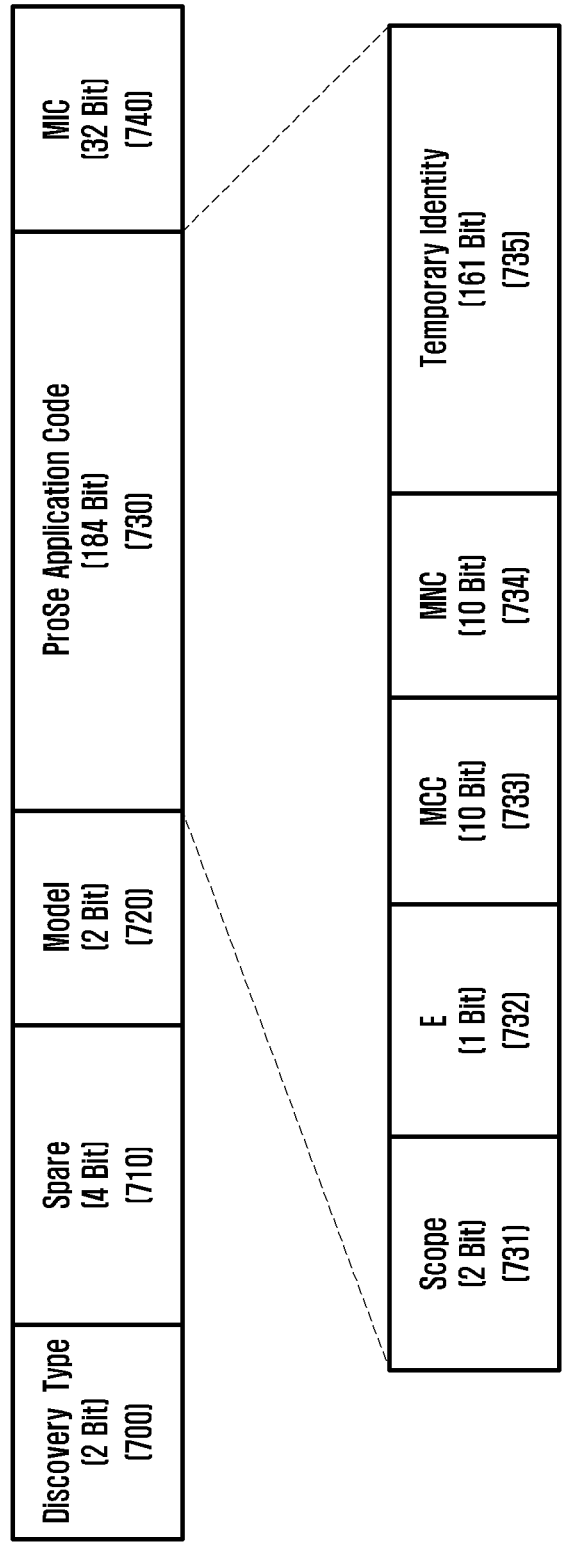
FIG. 7 is a diagram illustrating a discovery message format for D2D discovery specified in the legacy 3GPP standard.

FIG. 7 is a diagram illustrating a discovery message format for D2D discovery specified in the legacy 3GPP standard.

In reference to FIG. 7, the discovery message consists of 5 fields: Discovery Type 700, Spare 710, Model 720, ProSe Application Code 730, and MIC 740. Descriptions are made of the respective fields. The Discovery Type field indicates the discovery service type and is currently set to a value of Open discovery for anybody to hear. This means that there is no restriction on the target of the current discovery message. The Spare field is not in use currently, and it is reserved for future use. The Model field indicates the type of the D2D discovery which is currently fixed to Model A denoting the unidirectional broadcast. The ProSe Application Code field consists of 5 subfields: Scope 731 as a field allocated by the ProSe Function, E 732, MCC 733, MNC 734, and Temporary Identity 735. The Scope field indicates the use range of the MCC and MNC fields. The Scope field is set to 00 for a global scope, 10 for a country-specific scope, 11 for a PLMN-specific scope, or 01 as a reserved value for future use. The E field indicates whether the PLMN ID of the ProSe Function that has allocated the ProSe Application Code is included in the combination of the MCC and MNC fields. The E field is set to 0 for exclusion or 1 for inclusion of the PLMN ID in the combination of the MCC and MNC fields. The Temporary Identity field is set to a value substantially mapped to the ProSe Application ID.

Figure 8:
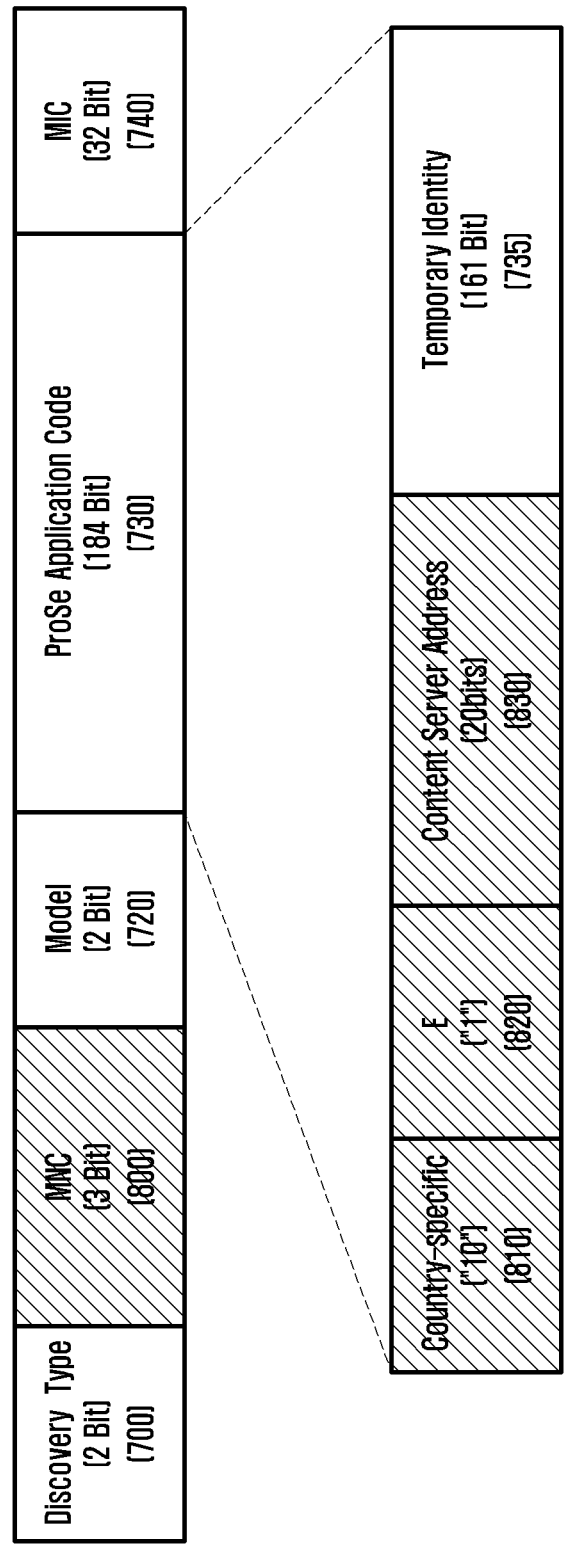
FIG. 8 is a diagram illustrating a D2D discovery message format proposed in the present invention.

FIG. 8 is a diagram illustrating a D2D discovery message format proposed in the present invention.

In reference to FIG. 8, the present invention is characterized in that the address of the ProSe Application ID that is stored in the contents server is inserted in the discovery message format specified in the standard as follows. First, the announcing UE replaces the spare field of the discovery message specified in the standard with an MNC field 800. The present invention uses a new MNC value instead of bringing 4 bits of the 10-bit MNC specified in the standard. This new MNC may be carried in a message broadcast in the network access process or may be a specific value preconfigured during the manufacturing phase. Also, the Scope field is filled with a value indicating the country-specific scope and then the MCC and MNC fields with the contents server address 830. In order to use the Scope field 810 to indicate the country-specific scope, the announcing and monitoring UEs generate the ProSe Application ID with a country-specific scope attribute That is, the ProSe Application ID has an attribute of mcc<MCC>.mnc*. The <MCC> denotes a specific country code. The E field 820 is set to 1.

If the HPLMN monitoring UE receives the D2D advertisement (ProSe Application Code) from the HPLMN announcing UE in FIG. 6, it assumes that an announcing UE located in the same PLMN has transmitted the advertisement with the MNC value in the Spare field as shown in FIG. 8 and thus transmits the ProSe Application Code to the HPLMN ProSe Function to request for the detail of the advertisement. In this case, if the non-home PLMN monitoring UE receives the D2D advertisement, it may assume that an announcing UE located in another PLMN has transmitted the announcement based on the MNC value of the Spare field as shown in FIG. 8.

Figure 9:
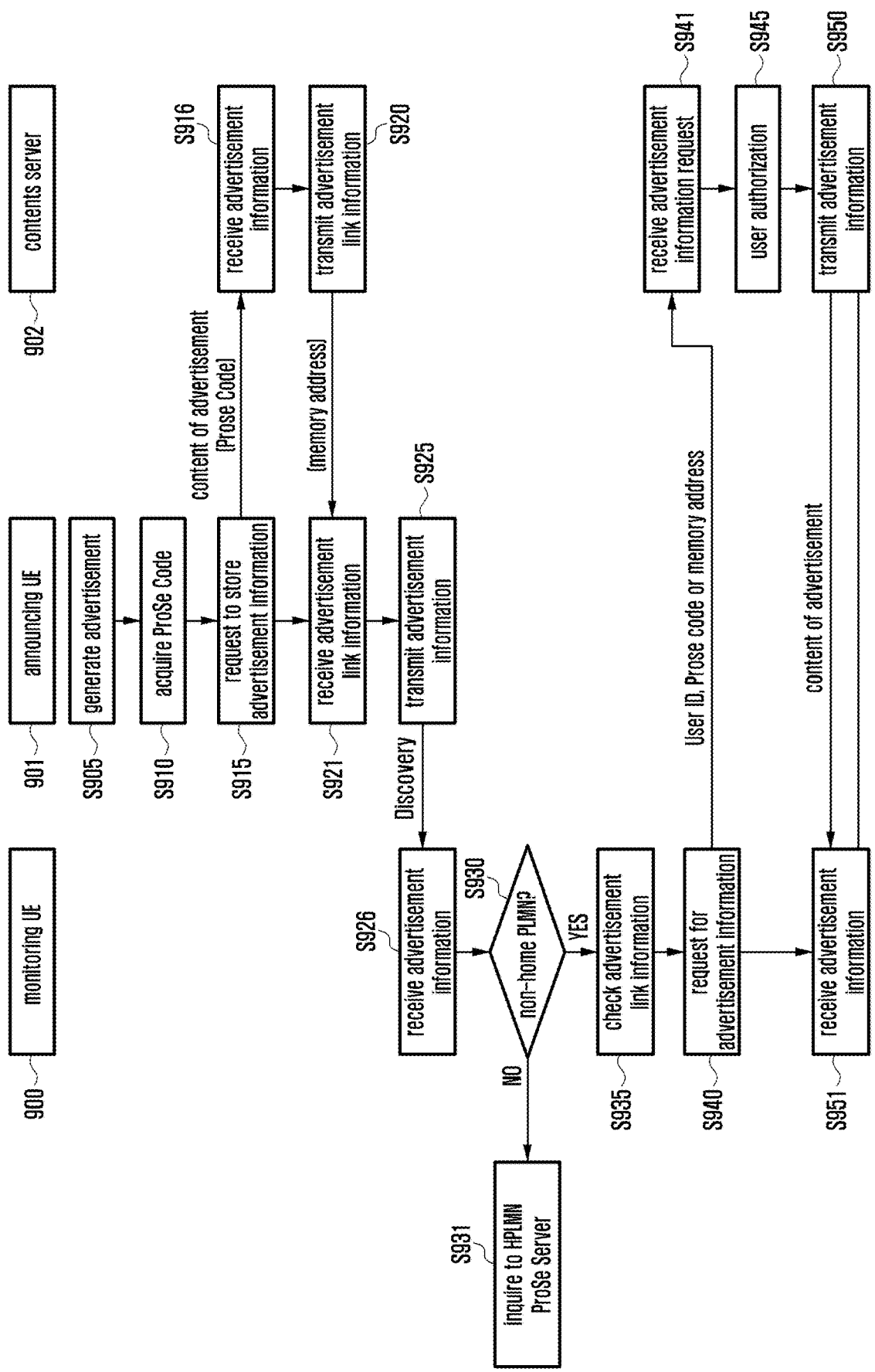
FIG. 9 is a flowchart illustrating per-entity operations in a D2D discovery procedure as proposed in the embodiment of FIG. 6.

FIG. 9 is a flowchart illustrating per-entity operations in a D2D discovery procedure as proposed in the embodiment of FIG. 6.

In reference to FIG. 9, an announcing UE 901 generates an advertisement at step S905 and acquires a ProSe Application Code from a ProSe Function at step S910. The announcing UE 901 requests to a contents server 902 for storing advertisement information at step S915, and the contents server 902 receives the advertisement information at step S916 and transmits advertisement link information to the announcing UE 901 at step S920. If the advertisement link information is received at step S921, the announcing UE 901 transmits the advertisement information to a monitoring UE 900 at step S925. If the advertisement information is received at step S926, the monitoring UE 900 determines whether the advertisement information is transmitted by a HPLMN announcing UE or a non-home PLMN announcing UE at step S930 and inquires, if it is determined that the advertisement information is transmitted by the HPLMN, to the HPLMN ProSe Function about the content of the advertisement at step S931 or checks, if it is determined that the advertisement information is transmitted by a non-home PLMN, for the advertisement link information at step S935. After checking the advertisement link information, the monitoring UE 900 requests to the contents server 902 for the advertisement information at step S940 and, if the advertisement information request is received at step S941, the contents server 902 authorizes the user at step S945. If the user is authorized, the contents server 902 transmits the advertisement information to the monitoring UE 900 at step S950. The monitoring UE 900 receives the advertisement information transmitted by the contents server 902 at step S950.

Figure 10:
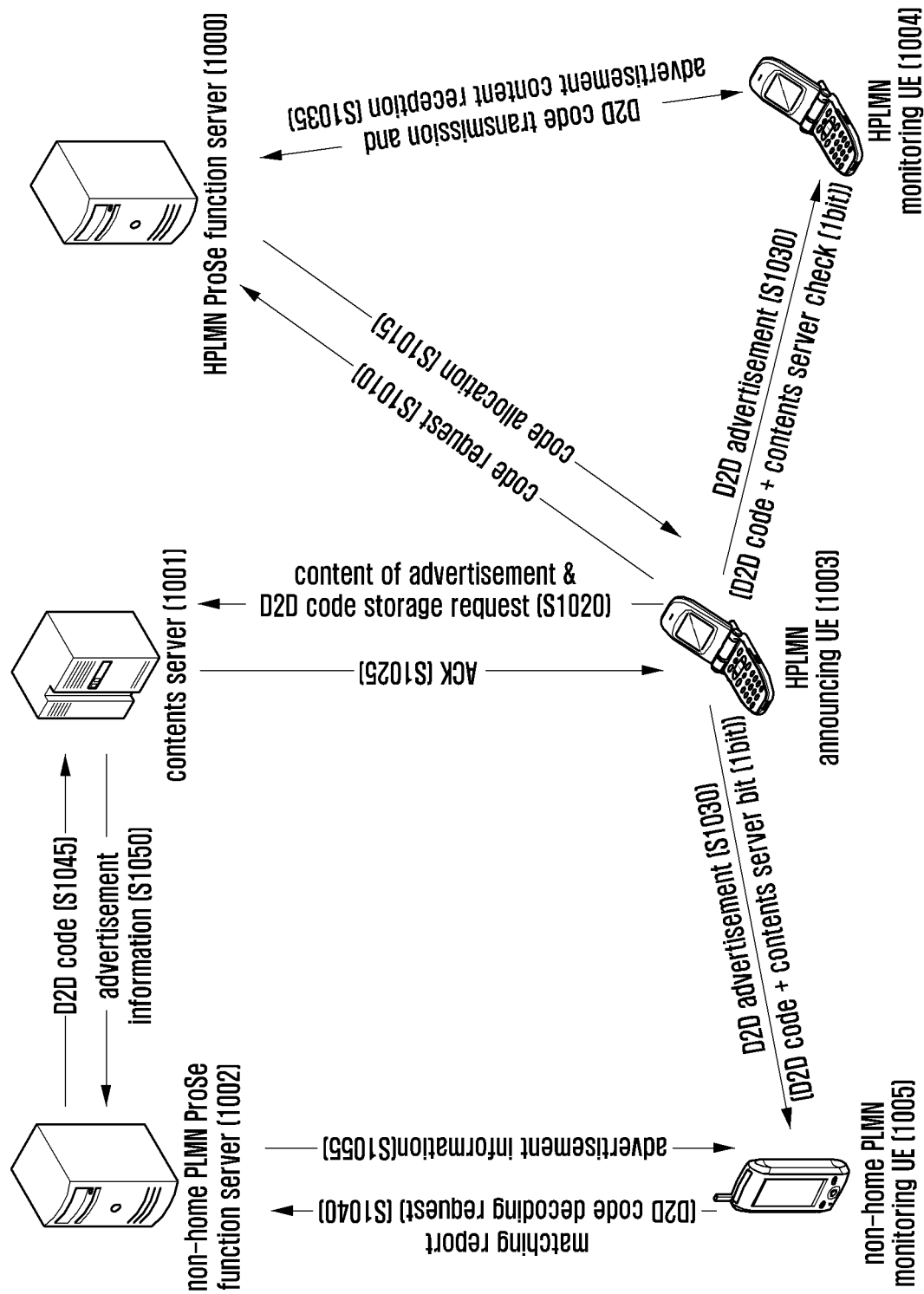
FIG. 10 is a diagram illustrating a contents server-assisted inter-PLMN D2D discovery service according to a second embodiment of the present invention.

FIG. 10 is a diagram illustrating a contents server-assisted inter-PLMN D2D discovery service according to a second embodiment of the present invention.

In reference to FIG. 10, an HPLMN announcing UE 1003 transmits a ProSe Application Code request to a HPLMN ProSe Function server 1000 at step S1010, and the HPLMN ProSe Function server 1000 generates and transmits a ProSe Application Code corresponding to a ProSe Application ID to the HPLMN announcing UE 1003 at step S1015. Upon receipt of the ProSe Application Code, the HPLMN announcing UE 1003 requests to a contents server 1001 for storing advertisement (ProSe Application ID) and ProSe Application Code at step S1020. The contents server 1001 transmits a reception acknowledgement to the HPLMN announcing UE 1003 at step S1025. Next, the HPLMN announcing UE 1003 broadcasts to the proximity UEs the ProSe Application Code and a contents server check bit in the discovery message format specified in the standard for D2D advertisement at step S1030. In the present invention, the contents server check bit is carried by a reserved field or bit of the discovery message.

If the D2D advertisement broadcast by the HPLMN announcing UE 1003 is received, a HPLMN monitoring UE 1004 transmits the ProSe Application Code to the HPLMN ProSe Function server 1000 and receives the detail of the D2D advertisement from the HPLMN ProSe Function server 1000 at step S1035. If the D2D advertisement broadcast by the HPLMN announcing UE 1003 is received, a non-home PLMN UE 1005 transmits a Matching report to a non-home PLMN ProSe Function server 1002 at step S1040. The matching report may include the information for instructing access to the contents server 1001 and the contents server address. The non-home PLMN ProSe Function server 1002 connects to the contents server 1001 with the contents server access address and transmits the ProSe Application Code to the contents server 1001 at step S1045, and the contents server 1001 transmits the advertisement information (ProSe Application ID) matching the received ProSe Application Code to the non-home PLMN ProSe function server 1002 at step S1050. The non-home PLMN ProSe Function server 1002 transmits the advertisement information to the non-home PLMN monitoring UE 1005 at step S1055.

Figure 11:
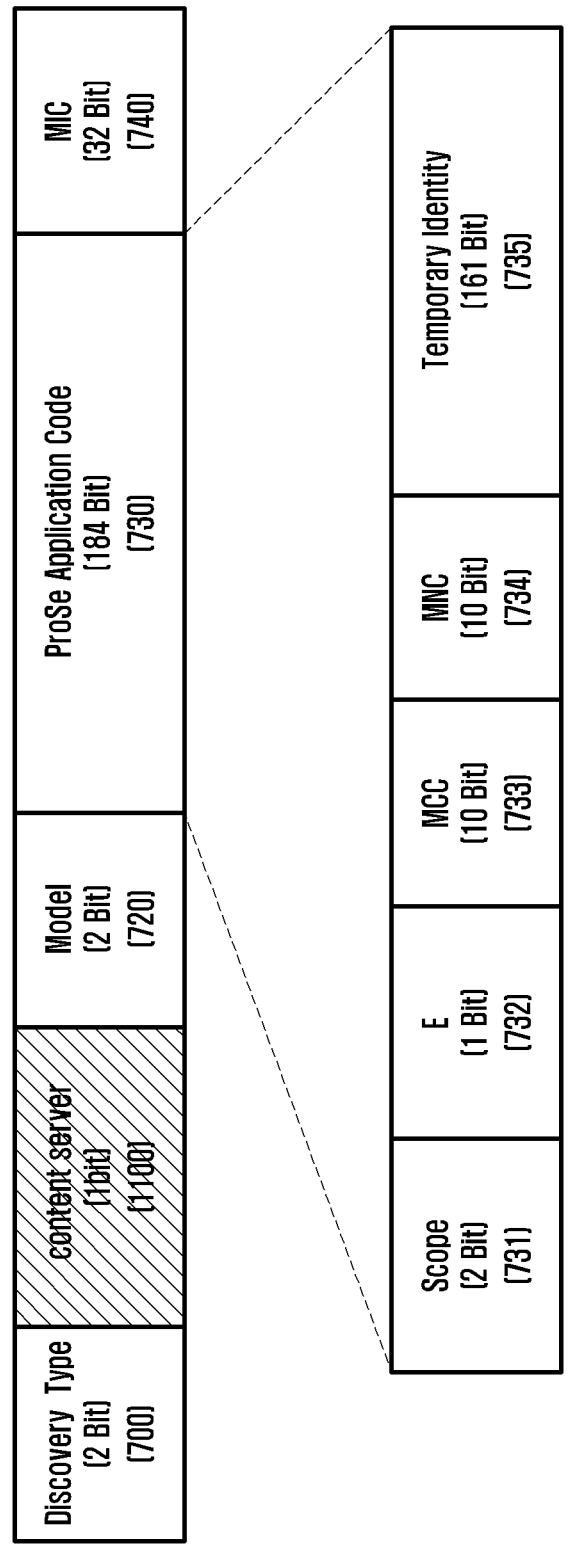
FIG. 11 is a diagram illustrating a D2D discovery message format proposed in the present invention.

FIG. 11 is a diagram illustrating a D2D discovery message format proposed in the present invention.

In reference to FIG. 11, the preset invention is characterized by using one bit of the spare field of the discovery message format specified in the standard as a contents server check bit. In order to set the Scope field 731 to a value indicating the PLMN-specific scope, the announcing or monitoring UE generates the ProSe Application ID with a PLMN-specific attribute. The ProSe Application ID has the attribute of mcc<MCC>.mnc<MNC>. <MCC> is a specific country code, and <MNC> is a specific mobile network code.

In the embodiment of FIG. 10, if the D2D advertisement transmitted by the HPLMN announcing UE is received, the HPLMN monitoring UE assumes that the D2D advertisement has been transmitted by a HPLMN announcing UE based on the MNC field value in the message format of FIG. 11 and then inquires to the HPLMN ProSe Function about the detail of the advertisement by transmitting the ProSe Application Code. If the D2D advertisement transmitted by the HPLMN announcing UE is received, the non-home PLMN monitoring UE assumes that the D2D advertisement has been transmitted by a announcing UE that is not its HPLMN based on MNC field value in the message format of FIG. 11 and then transmits a matching report to its HPLMN ProSe Function server.

Figure 12:
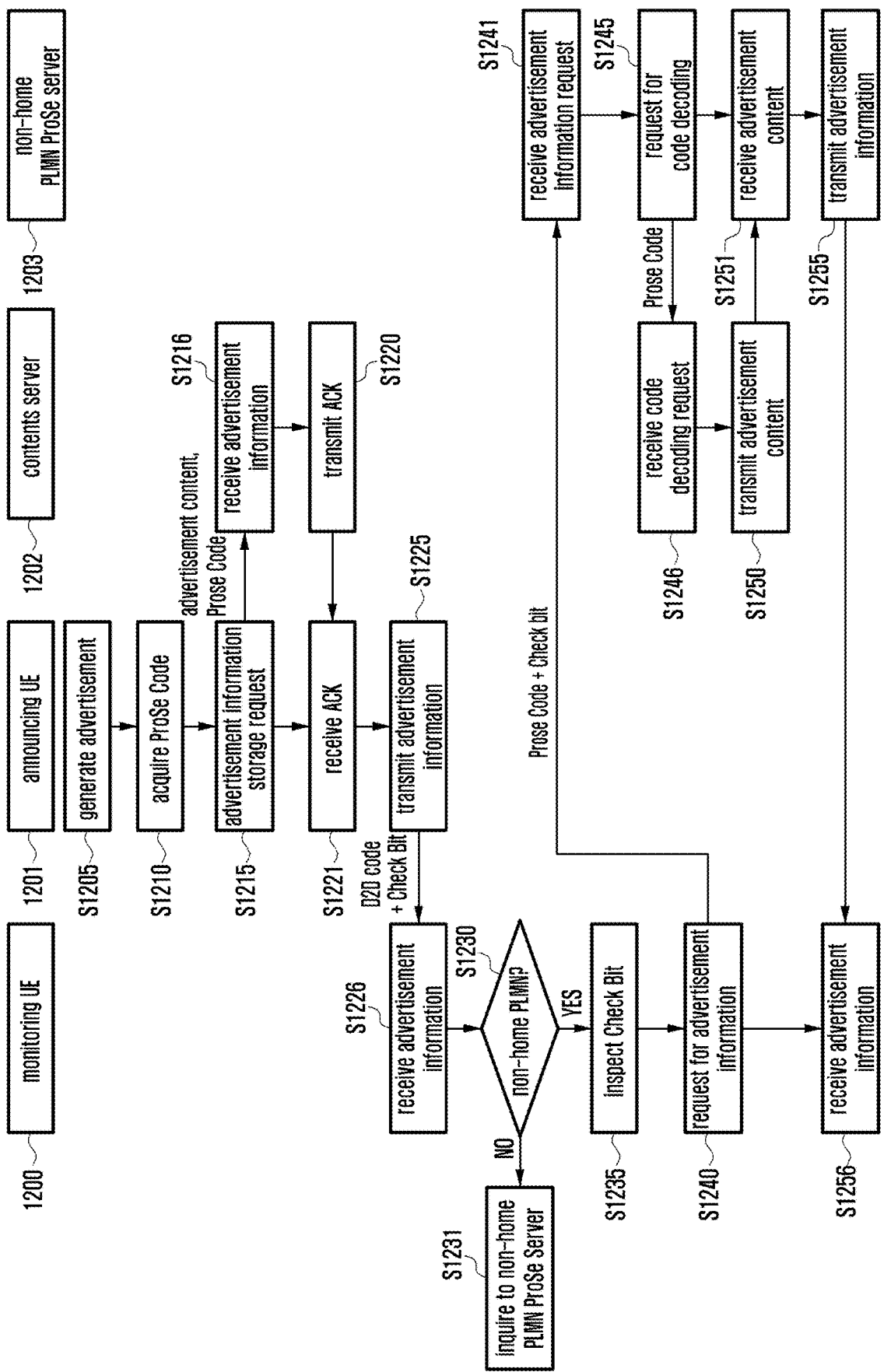
FIG. 12 is a flowchart illustrating per-entity operation in a D2D discovery procedure as proposed in the embodiment of FIG. 10.

FIG. 12 is a flowchart illustrating per-entity operations in a D2D discovery procedure as proposed in the embodiment of FIG. 10.

In reference to FIG. 12, an announcing UE 1201 generates an advertisement at step S1205 and acquires a ProSe Application Code from a ProSe Function server at step S1210. The announcing UE 1201 requests to a contents server 1202 for storing advertisement information at step S1215, and the contents server 1202 receives the advertisement information at step S1216 and transmits a reception acknowledgement information to the announcing UE 1201 at step S1220. The announcing UE 1201 receives the acknowledgement information at step S1221 and transmits the advertisement information to a monitoring UE 1200 at step S1225. If the advertisement information is received at step S1226, the monitoring UE 1200 determines whether the advertisement information is transmitted by a HPLMN announcing UE or a non-home PLMN announcing UE at step S1230 and inquires, if it is determined that the advertisement information is transmitted by the HPLMN, to the HPLMN ProSe Function about the content of the advertisement at step S1231 or checks, if it is determined that the advertisement information is transmitted by a non-home PLMN, the contents server check bit at step S1235. After checking the contents server check bit, the monitoring UE 1200 requests to a non-home PLMN ProSe Function server 1203 for the advertisement information at step S1240 and, if the advertisement information request is received at step S1241, the non-home PLMN ProSe Function server 1203 transmits a code decoding request to the contents server 1202 at step S1245. The contents server 1202 receives the code decoding request at step S1246 and transmits the content of the advertisement to the non-home PLMN ProSe Function server 1203 at step S1250. If the content of the advertisement is received at step S1251, the non-home PLMN 1203 transmits the content of the advertisement to the monitoring UE 1200 at step S1255. The monitoring UE 1200 receives the broadcast information form the non-home PLMN ProSe Function server 1203 at step S1256.

Also, the present invention provides an apparatus and method for performing inter-PLMN D2D advertisement in a system supporting UEs equipped with multiple PLMN-specific modems.

Figure 13:
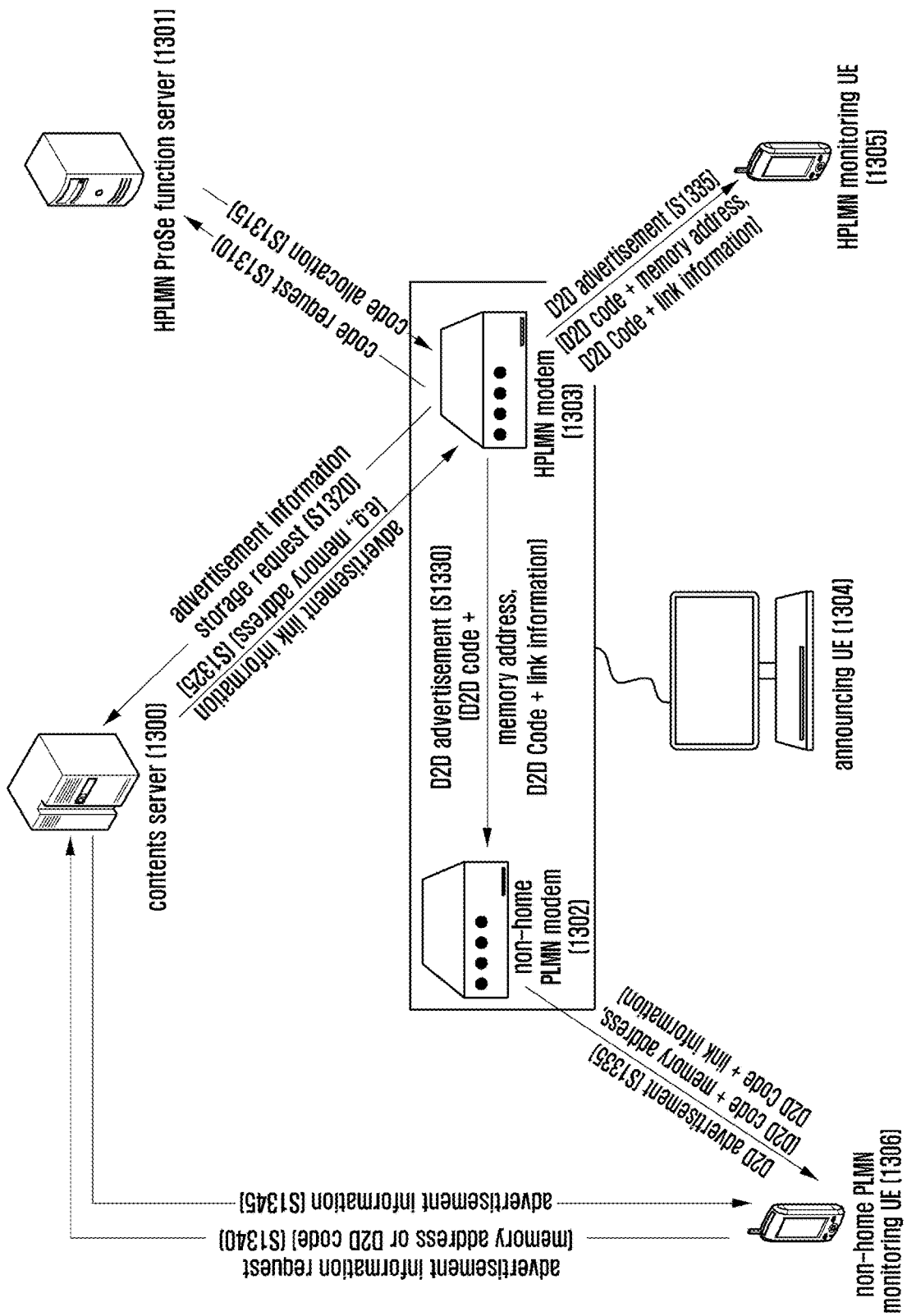
FIG. 13 is a diagram illustrating a contents server-assisted inter-PLMN D2D advertisement procedure for UEs equipped with multiple PLMN-specific communication modems in a communication system according to a first embodiment of the present invention.

FIG. 13 is a diagram illustrating a contents server-assisted inter-PLMN D2D advertisement procedure for UEs equipped with multiple PLMN-specific communication modems in a communication system according to a first embodiment of the present invention.

In reference to FIG. 13, an announcing UE 1304 has a plurality of PLMN-specific communication modems 1302 and 1303 for communication with the corresponding PLMNs. An HPLMN modem 1303 transmits a code request to a HPLMN ProSe Function 1301 for receiving a ProSe Application Code at step S1310, and the HPLMN ProSe Function server 1301 transmits to the HPLMN modem 1303 the ProSe Application Code corresponding to a ProSe Application ID at step S1315. If the ProSe Application Code is received, the HPLMN modem 1303 requests to a contents server 1300 for storing advertisement information (ProSe Application ID) at step S1320. The contents server 1300 stores the corresponding ProSe Application ID and transmits D2D advertisement link information to the HPLMN modem 1303 at step S1325. The D2D advertisement link information may be a storage address of the ProSe Application ID; the storage address may be expressed in various forms, e.g., a memory address where the ProSe Application ID is stored. Next, the HPLMN modem 1303 transfers the ProSe Application code and advertisement link information to a non-home PLMN modem 1302 for D2D advertisement at step S1330.

The HPLMN modem 1303 and the non-home PLMN modem 1302 broadcast the ProSe Application Code to the monitoring UEs within the respective PLMNs at step S1335 in the D2D discovery message format specified in the standard. In the present invention, the storage address where the advertisement information is stored in the contents server 1300 may be transmitted to the proximity UEs using a reserved field or bit(s) of the discovery message. If the D2D advertisement is received, the non-home PLMN monitoring UE 1306 accesses the contents server 1300 with the contents server address to request for the advertisement information at step S1340 by transmitting the memory address where the ProSe Application ID is stored or the ProSe Application Code. In the present invention, it is assumed that all UEs know the address of the contents server. Afterward, the contents server 1300 transmits the ProSe Application ID (advertisement information) stored in the memory address to the non-home PLMN monitoring UE 1306 at step S345.

The D2D discovery-based advertisement procedure of FIG. 13 is similar to that of FIG. 6 with the exception of the internal operation of the announcing UE.

Figure 14:
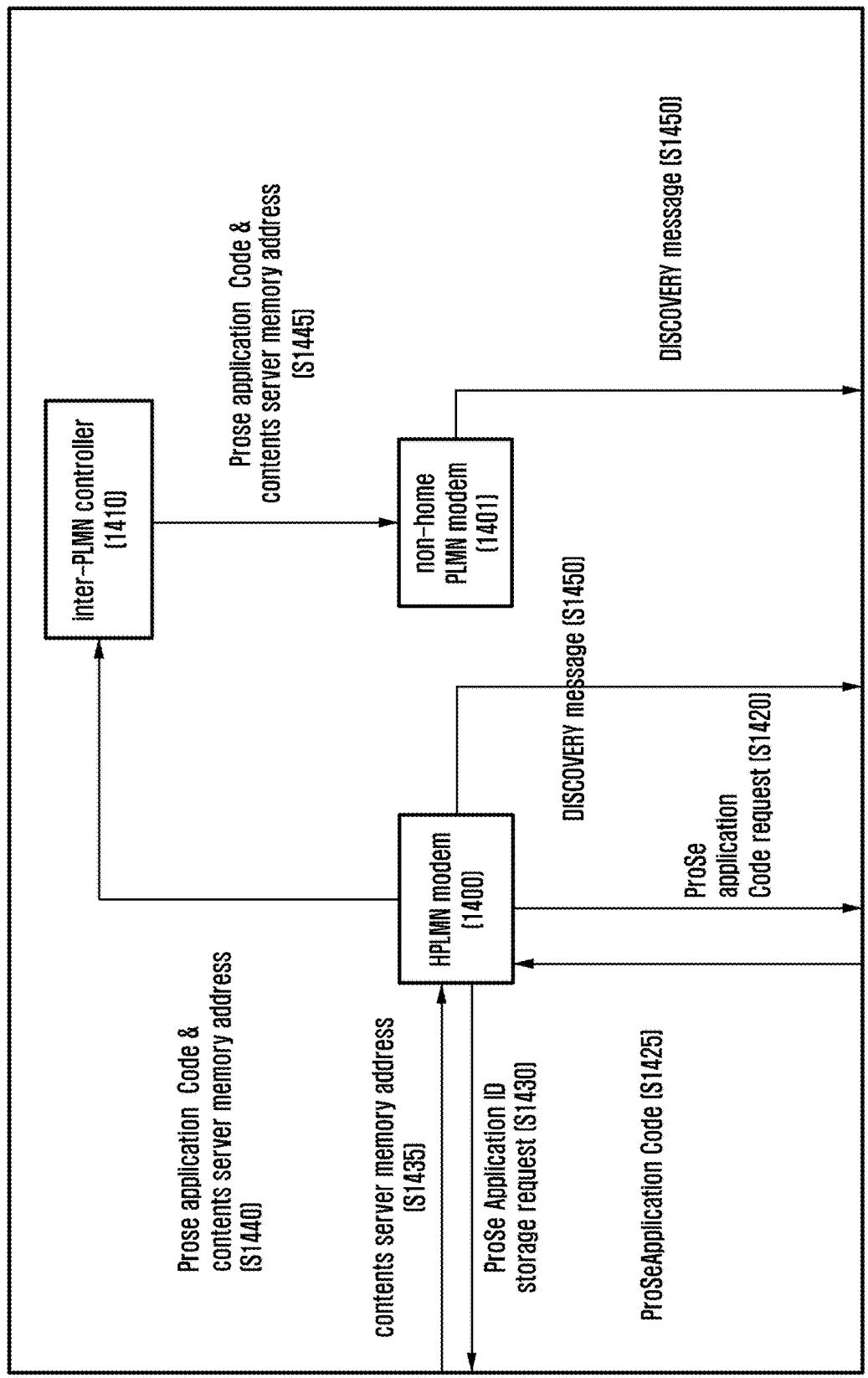
FIG. 14 is a diagram illustrating a configuration of a UE equipped with multiple PLMN-specific communication modems.

FIG. 14 is a diagram illustrating a configuration of a UE equipped with multiple PLMN-specific communication modems.

In reference to FIG. 14, at step S1330 of FIG. 13, the HPLMN modem 1400 transfers the information received from the HPLMN ProSe Function server and the contents server to the non-home PLMN modem 1401 via an inter-PLMN controller 1410 through steps S1440 and S1445. The non-home PLMN modem 1401 broadcasts the discovery message using the information received from the inter-PLMN controller 1410 at step S1450.

Figure 15:
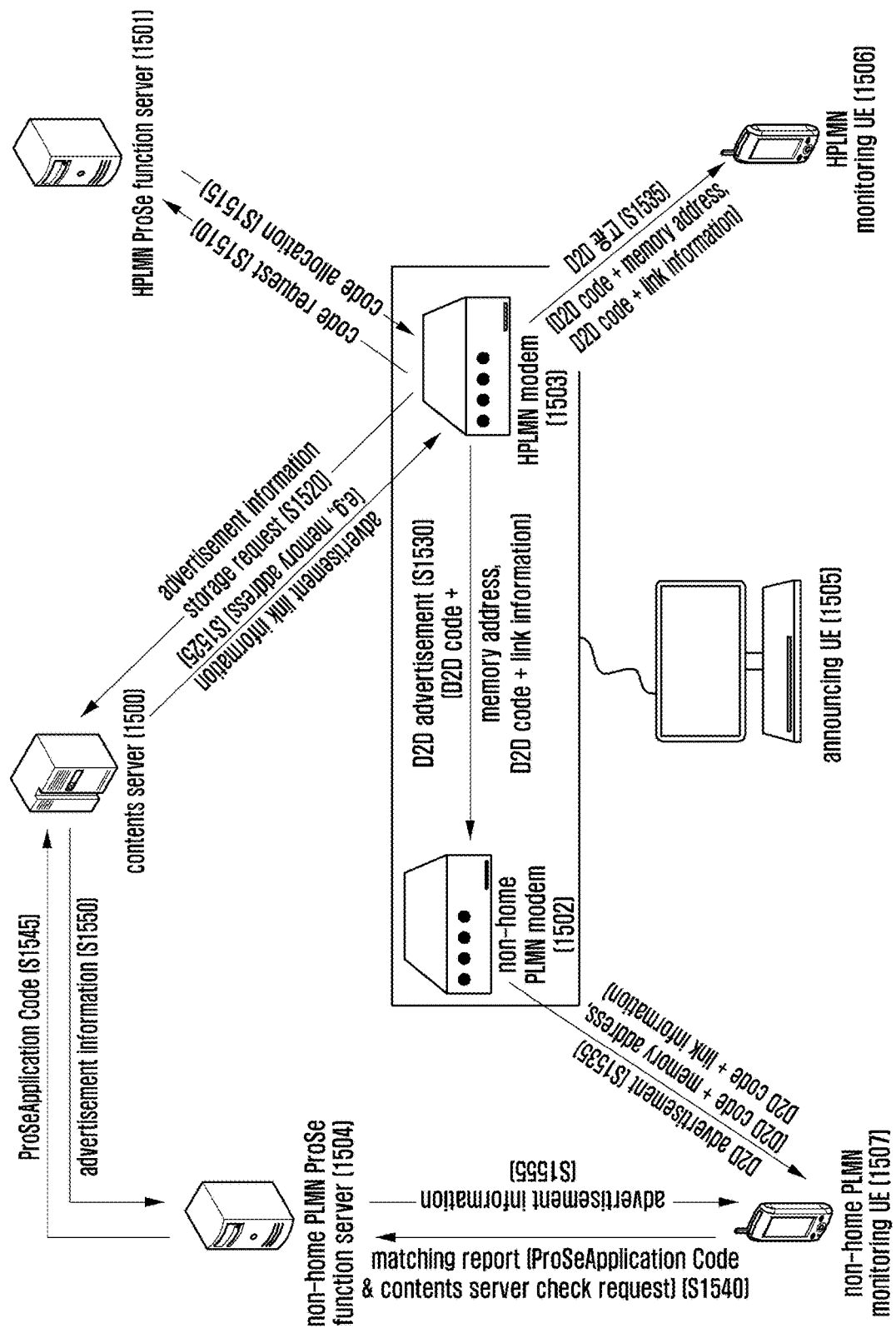
FIG. 15 is a diagram illustrating a contents server-assisted inter-PLMN D2D advertisement procedure for UEs equipped with multiple PLMN-specific communication modems according to a second embodiment of the present invention.

FIG. 15 is a diagram illustrating a contents server-assisted inter-PLMN D2D advertisement procedure for UEs equipped with multiple PLMN-specific communication modems according to a second embodiment of the present invention.

In reference to FIG. 15, a HPLMN modem 1503 transmits a code request to a HPLMN ProSe Function server 1501 for receiving a ProSe Application Code at step S1510, and the HPLMN ProSe Function server 1501 transmits to the HPLMN modem 1303 the ProSe Application Code corresponding to a ProSe Application ID at step S1515. If the ProSe Application Code is received, the HPLMN modem 1503 request to a contents server 1500 for storing advertisement information (ProSe Application ID) and the ProSe Application code at step S1520. The contents server 1500 transmits a request reception acknowledgement to the HPLMN modem 1503 at step S1525.

Afterward, the HPLMN modem 1503, at step S1530, transfers to the non-home PLMN modem 1502 the ProSe Application Code and advertisement link information for D2D advertisement. The HPLMN modem 1503 and the non-home PLMN modem 1502 broadcast the ProSe Application Code and contents server check bit for D2D advertisement to the monitoring UEs within the respective PLMNs at step S1535 in the D2D discovery message format specified in the standard. In the present invention, the contents server check bit may be transmitted to the proximity UEs by means of a reserved field or bit(s) of the discovery message.

If the D2D advertisement transmitted by the non-home PLMN modem 1502 is received, a non-home PLMN monitoring UE 1507 transmits a matching report to a non-home PLMN ProSe Function server 1504 at step S1540. The matching report may include information for instructing access to the contents server 1500 and the contents server access address. The non-home PLMN ProSe Function server 1504 connects to the contents server 1500 with the contents server access address and transmits the ProSe Application Code to the contents server 1500 at step S1545, and the contents server 1500 transmits the advertisement information (ProSe Application ID) matching the received ProSe Application Code to the non-home PLMN ProSe Function server 1504 at step S1550. The non-home PLMN ProSe Function server 1504 transmits the advertisement information to the non-home PLMN monitoring UE 1507 at step S1555.

Figure 16:
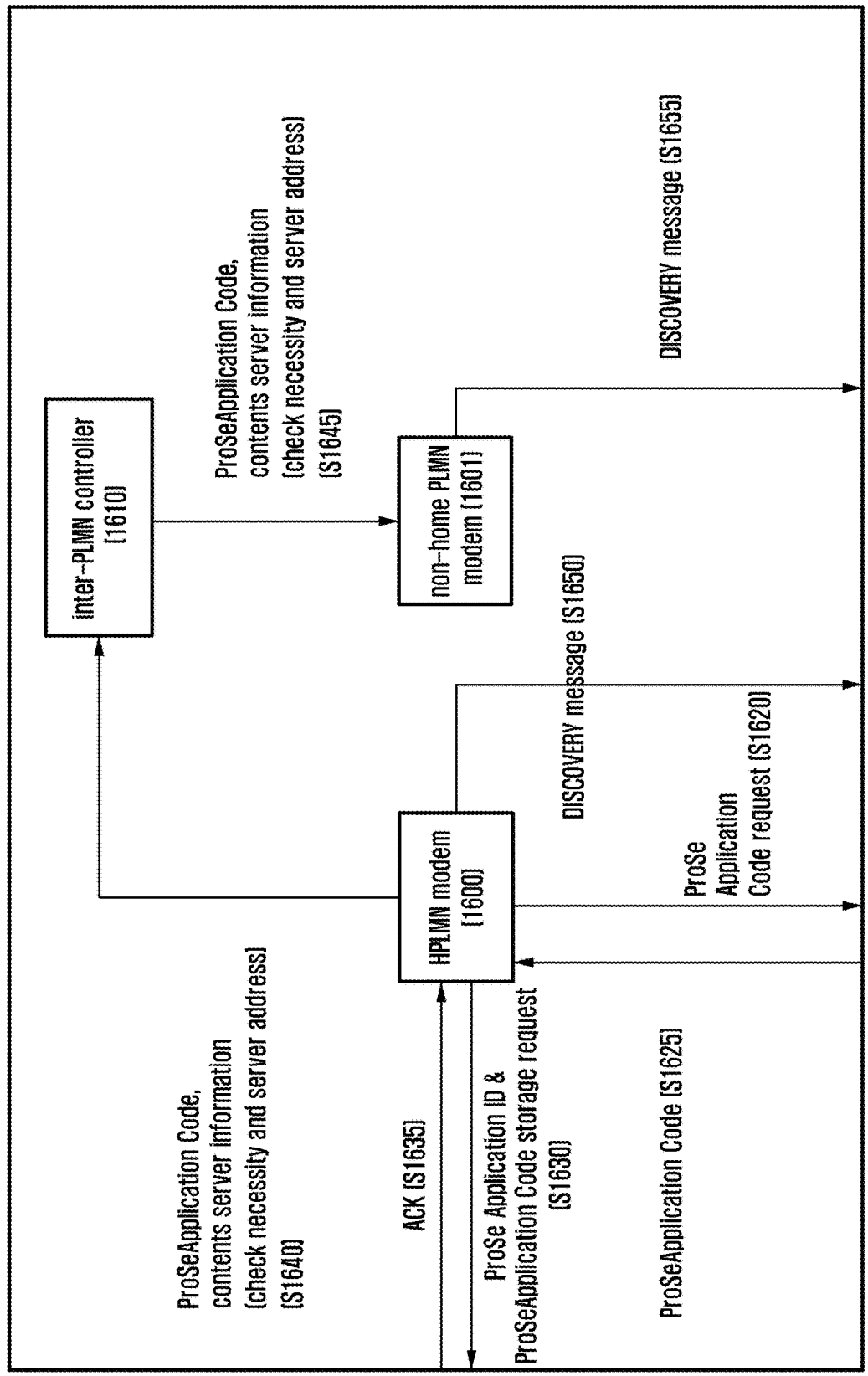
FIG. 16 is a diagram illustrating a configuration of a UE equipped with multiple PLMN-specific communication modems.

FIG. 16 is a diagram illustrating a configuration of a UE equipped with multiple PLMN-specific communication modems.

In reference to FIG. 16, at step S1530 of FIG. 15, the HPLMN modem 1600 transfers the information received from the HPLMN ProSe Function server and the contents server to the non-home PLMN modem 1601 via an inter-PLMN controller 1610 through steps S1640 and S1645. The non-home PLMN modem 1601 broadcasts the discovery message using the information received from the inter-PLMN controller 1610 at step S1450.

Figure 17:
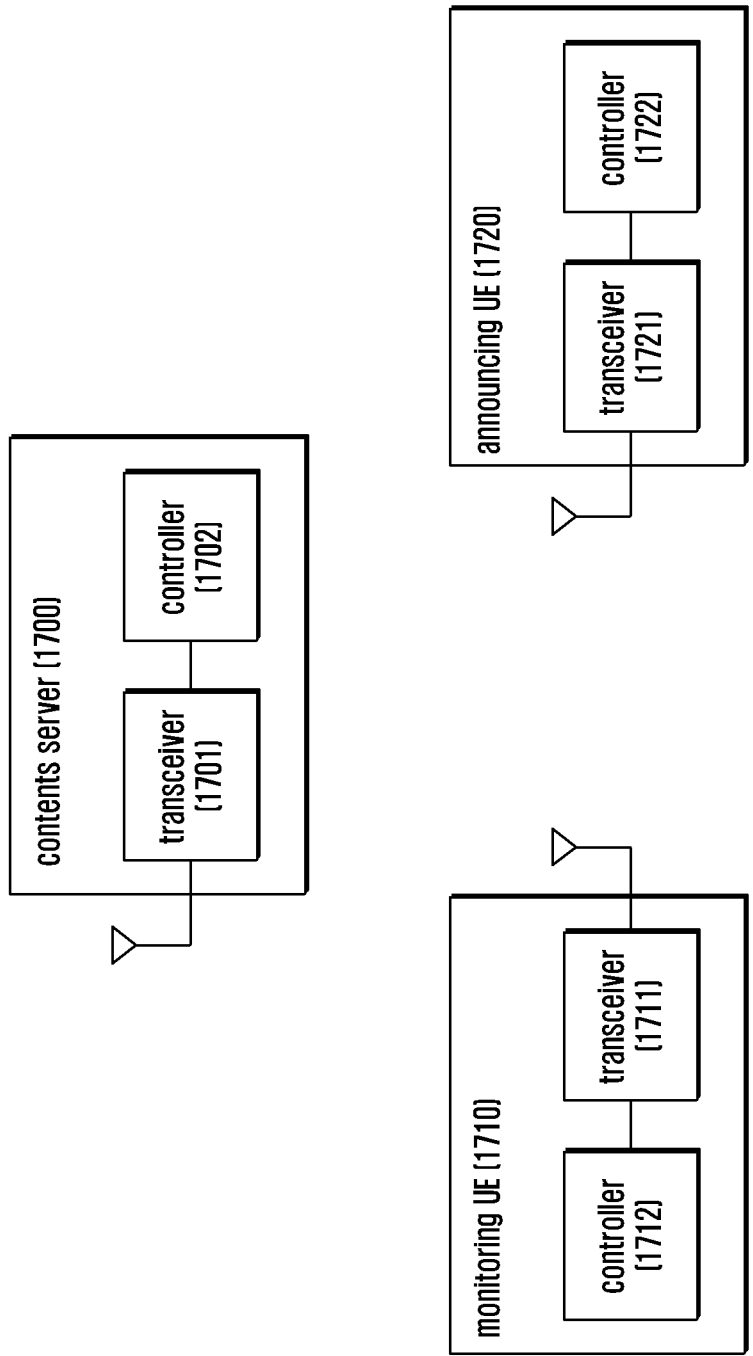
FIG. 17 is a block diagram illustrating configurations of entities for performing the inter-PLMN discovery procedure of the present invention.

FIG. 17 is a block diagram illustrating configurations of entities for performing the inter-PLMN discovery procedure of the present invention.

In reference to FIG. 17, a contents server 1700 may include a transceiver 1701 and a controller 1702. The transceiver 1701 may receive advertisement information broadcast by announcing UEs and transmit advertisement link information or reception acknowledgement to an announcing UE. The transceiver may also receive an advertisement information request transmitted by a monitoring UE and transmit the advertisement information (ProSe Application ID) and may receive the ProSe Application Code transmitted by a ProSe Function and transmit the advertisement information matching the received code. The controller 1702 controls the transceiver 1701 to operate as described above.

A monitoring UE 1710 may include a transceiver 1711 and a controller 1712. The transceiver 1711 may receive the discovery message transmitted by an announcing UE and exchange a ProSe Application Code, advertisement information, contents server check bit, and/or advertisement information with a HPLMN ProSe Function, a non-home PLMN ProSe Function, and a contents server. The controller 1712 controls the transceiver 1711 to operate as described above.

An announcing UE 1720 may include a transceiver 1721 and a controller 1722.

The transceiver 1721 transmits a ProSe Application ID to an HPLMN ProSe Function and receives a ProSe Application Code from the HPLMN ProSe Function. The transceiver may also transmit the ProSe Application ID (advertisement information) to a contents server and receive advertisement link information or reception acknowledgement from the contents server. The transceiver 1721 may also broadcast a discovery message including the ProSe Application Code, advertisement link information, and/or contents server check bit. The controller 1722 controls the transceiver 1721 to operate as described above. In particular, the controller 1722 may perform the operations of the inter-PLMN controller 1410 of FIG. 14 and the inter-PLMN controller 16010 of FIG. 16.

The invention claimed is:

1. An advertisement broadcast method of a first terminal performing device-to-device (D2D) communication, the method comprising:
   generating advertisement information;
   acquiring an advertisement code based on the advertisement information;
   transmitting the advertisement information to a content server;
   receiving advertisement-related information from the content server; and
   broadcasting a discovery message including the advertisement code and the advertisement-related information,
   wherein the discovery message is received by a second terminal and used by the second terminal to determine whether a public land mobile network (PLMN) of the second terminal is identical with a PLMN of the first terminal broadcasting the discovery message,
   wherein an advertisement information request, including the advertisement code or the advertisement-related information, is transmitted to the content server from the second terminal, in a case that the PLMNs are different from each other, and
   wherein the advertisement information is transmitted to the second terminal from the content server, in response to the advertisement information request.

2. The method of claim 1, wherein the advertisement-related information comprises a memory address of the content server where the advertisement information is stored.

3. The method of claim 1, wherein the advertisement information is a proximity services (ProSe) application identifier (ID), and the advertisement code is a prose application code.

4. An advertisement reception method of a second terminal performing device-to-device (D2D) communication, the method comprising:
receiving a discovery message including an advertisement code and advertisement-related information, the discovery message being broadcast by a first terminal;
determining whether a public land mobile network (PLMN) of the second terminal is identical with a PLMN of the first terminal based on the advertisement code included in the discovery message;
transmitting, in a case that the PLMNs are different from each other, an advertisement information request to a content server; and
receiving advertisement information from the content server,
wherein the advertisement information request comprises the advertisement code or the advertisement-related information.

5. The method of claim 4, wherein the first terminal acquires the advertisement code based on the advertisement information generated by the first terminal before the second terminal receives the advertisement code and advertisement-related information from the first terminal, the advertisement information is transmitted from the first terminal to the content server, and the advertisement-related information is transmitted from the content server to the first terminal.

6. The method of claim 4, wherein the advertisement-related information comprises a memory address of the content server where the advertisement information is stored.

7. The method of claim 4, wherein the advertisement information is a proximity services (ProSe) application identifier (ID), and the advertisement code is a prose application code.

8. An advertisement broadcast assistance method of a content server supporting device-to-device (D2D) discovery, the method comprising:
receiving advertisement information transmitted by a first terminal;
transmitting advertisement-related information to the first terminal;
receiving, in a case that a public land mobile network (PLMN) of the first terminal is not identical with a PLMN of a second terminal, an advertisement information request transmitted by the second terminal; and
transmitting the advertisement information to the second terminal,
wherein the first terminal broadcasts a discovery message including an advertisement code generated based on the advertisement information and the advertisement-related information, and the second terminal receives the discovery message and determines whether the PLMNs of the first and second terminals are identical with each other based on the advertisement code.

9. The method of claim 8, wherein the advertisement-related information comprises a memory address of the content server where the advertisement information is stored.

10. The method of claim 8, wherein the advertisement information is a proximity services (ProSe) application identifier (ID), and the advertisement code is a prose application code.

11. A first terminal for broadcasting a device-to-device (D2D) advertisement, the first terminal comprising:
a transceiver which transmits and receives signals; and
a controller which configured to generate advertisement information, acquires an advertisement code based on the advertisement information, and transmit the advertisement information to a content server, receive advertisement-related information from the content server, and broadcast a discovery message including the advertisement code and the advertisement-related information,
wherein the discovery message is received by a second terminal and used by the second terminal to determine whether a public land mobile network (PLMN) of the second terminal is identical with a PLMN of the first terminal broadcasting the discovery message,
wherein an advertisement information request including, the advertisement code or the advertisement-related information, is transmitted to the content server from the second terminal, in a case that the PLMNs are different from each other, and
wherein the advertisement information is transmitted to the second terminal from the content server, in response to the advertisement information request.

12. The first terminal of claim 11, wherein the advertisement-related information comprises a memory address of the content server where the advertisement information is stored.

13. The first terminal of claim 11, wherein the advertisement information is a proximity services (prose) application identifier (ID), and the advertisement code is a prose application code.

14. A second terminal for receiving a device-to-device (D2D) advertisement, the second terminal comprising:
a transceiver which transmits and receives signals; and
a controller which configured to receive a discovery message including an advertisement code and advertisement-related information, the discovery message being broadcast by a first terminal, determines whether a Public Land Mobility Network (PLMN) of the second terminal is identical with a PLMN of the first terminal based on the advertisement code included in the discovery message, and transmit, in a case that the PLMNs are different from each other, an advertisement information request to a content server and receive advertisement information from the content server in response to the advertisement information request,
wherein the advertisement information request comprises the advertisement code or the advertisement-related information.

15. The second terminal of claim 14, wherein the first terminal acquires the advertisement code based on the advertisement information generated by the first terminal before the second terminal receives the advertisement code and advertisement-related information from the first terminal, the advertisement information is transmitted from the first terminal to the content server, and the advertisement-related information is transmitted from the content server to the first terminal.

16. The second terminal of claim 14, wherein the advertisement-related information comprises a memory address of the content server where the advertisement information is stored.

17. The second terminal of claim 14, wherein the advertisement information is a proximity services (prose) application identifier (ID), and the advertisement code is a prose application code.

18. A content server for assisting device-to-device (D2D) discovery advertisement broadcast, the content server comprising:
- a transceiver which transmits and receives signals; and
- a controller which configured to receive advertisement information transmitted by a first terminal, transmit advertisement-related information to the first terminal, receive, in a case that a public land network (PLMN) of the first terminal is identical with a PLMN of a second terminal, an advertisement information request transmitted by the second terminal, and transmit the advertisement information to the second terminal in response to the advertisement information request,
- wherein the first terminal broadcasts a discovery message including an advertisement code generated based on the advertisement information and the advertisement-related information, and the second terminal receives the discovery message and determines whether the PLMNs of the first and second terminals are identical with each other based on the advertisement code.

19. The content server of claim 18, wherein the advertisement-related information comprises a memory address of the content server where the advertisement information is stored.

20. The content server of claim 18, wherein advertisement information is a proximity services (ProSe) application identifier (ID), and the advertisement code is a prose application code.

* * * * *